US012374887B1

(12) United States Patent
Steinbacher

(10) Patent No.: US 12,374,887 B1
(45) Date of Patent: Jul. 29, 2025

(54) SYSTEM AND METHOD FOR RESTORATION OF A POWER SYSTEM

(71) Applicant: Genesis Grid Consulting, LLC, Moseley, VA (US)

(72) Inventor: Richard Steinbacher, Moseley, VA (US)

(73) Assignee: GENESIS GRID CONSULTING, LLC, Moseley, VA (US)

( * ) Notice: Subject to any disclaimer, the term of this patent is extended or adjusted under 35 U.S.C. 154(b) by 0 days.

(21) Appl. No.: 19/097,201

(22) Filed: Apr. 1, 2025

(51) Int. Cl.
*H02J 3/00* (2006.01)
*H02J 3/38* (2006.01)
*H02J 3/40* (2006.01)

(52) U.S. Cl.
CPC .............. *H02J 3/001* (2020.01); *H02J 3/381* (2013.01); *H02J 3/388* (2020.01); *H02J 3/40* (2013.01); *H02J 2203/10* (2020.01); *H02J 2203/20* (2020.01); *H02J 2300/40* (2020.01)

(58) Field of Classification Search
CPC .. H02J 3/001; H02J 3/381; H02J 3/388; H02J 3/40; H02J 2203/10; H02J 2203/20; H02J 2300/40
See application file for complete search history.

(56) References Cited

U.S. PATENT DOCUMENTS

| | | | |
|---|---|---|---|
| 8,335,595 B2 | 12/2012 | Tolnar | |
| 9,300,134 B2 * | 3/2016 | Lin | ........................ H02J 3/001 |
| 9,553,455 B2 | 1/2017 | Horsfield | |
| 9,660,451 B1 | 5/2017 | Naiknaware | |
| 10,320,193 B2 | 6/2019 | Porter | |
| 10,439,433 B2 | 10/2019 | Golshani | |
| 10,833,507 B2 * | 11/2020 | Manson | ................... H02J 3/381 |
| 10,958,099 B2 | 3/2021 | Biswas | |
| 11,955,801 B2 | 4/2024 | Price | |
| 2004/0008010 A1 * | 1/2004 | Ebrahim | ................... H02P 9/04 322/44 |
| 2016/0139212 A1 * | 5/2016 | Lin | ................... H02J 13/00002 702/108 |
| 2017/0178756 A1 * | 6/2017 | Ingersoll | ................. G21D 3/04 |
| 2017/0178757 A1 * | 6/2017 | Hough | ..................... G21D 1/00 |
| 2017/0222409 A1 * | 8/2017 | Oehring | ............... H02J 3/0073 |

FOREIGN PATENT DOCUMENTS

| | | |
|---|---|---|
| AU | 2006340323 B2 | 2/2011 |
| CN | 113452021 B | 6/2022 |
| JP | 2022552050 A | 12/2022 |
| KR | 102478753 B1 | 12/2022 |
| WO | 2019143386 A1 | 7/2019 |

* cited by examiner

Primary Examiner — Ziaul Karim
(74) Attorney, Agent, or Firm — Keefe IP Law, PLLC

(57) ABSTRACT

A method for controlling power restoration of a power grid is disclosed. The method includes setting initial conditions on the power grid based on a combined model of the power grid, setting the initial conditions including at least one of controlling a plurality of field components of the power grid or sending information for controlling the plurality of field components, wherein controlling the plurality of field components includes opening a plurality of breakers, and performing a first iterative process including: performing a balancing operation that includes determining if a frequency of a black start generator of the power grid meets generator criteria, determining if a voltage of a generator voltage bus of the power grid meets bus criteria, or determining if an MW of an isochronous generator of the power grid meets MW criteria.

17 Claims, 35 Drawing Sheets

SYSTEM AND METHOD FOR RESTORATION OF A POWER SYSTEM

FIELD OF THE INVENTION

The present disclosure generally relates to a system and method for a power system, and more particularly to a system and method for power restoration of a power system.

BACKGROUND OF THE INVENTION

Today's society, economy, and infrastructure depend on a robust and functioning power grid. Power grid failures can have significant financial and societal impacts. For example, the consequences of a power system loss can include cellular service failure, internet failure, interruption of commercial activity, loss of comforts such as heating and/or cooling, food supply disruption, disruption of transportation, and other losses. It has been estimated that the financial cost of the 2003 Northeast blackout is between about USD 4 and 10 billion.

When power grids experience failure, the process of restoring the power grid can take a substantial amount of time to complete using conventional techniques. The time to complete the restoration process can be lengthy and, due to its complexity, has a relatively high potential for errors. Mistakes in this undertaking can result in having to restart the entire procedure from the beginning. For example, re-collapse of the power grid may occur due to mistakes made during power generation restoration, which can lengthen the amount of time involved for restoring power, which may increase the chances that backup or auxiliary batteries may be drained and/or fuel supplies may be exhausted, thereby making restoration even more complicated and lengthy. A vicious cycle may thereby occur, in which power restoration becomes even more challenging following each re-collapse.

Due to the structure of the utility industry, the information and controlling systems involved in performing a system restoration typically do not fall under the control of a single utility or operating authority. Generation companies, transmission companies, and distribution utilities and/or electric cooperatives are not under unified control. The significant coordination involved between these entities increases the probability of mistakes and re-collapse of the grid.

Accordingly, a need in the art exists for quick and efficient restoration of the power grid, including reducing or eliminating mistakes made in restoration of power systems.

The exemplary disclosed system and method are directed to overcoming one or more of the shortcomings set forth above and/or other deficiencies in existing technology.

SUMMARY OF THE INVENTION

In one exemplary aspect, the present disclosure is directed to a method for controlling power restoration of a power grid. The method includes setting initial conditions on the power grid based on a combined model of the power grid, setting the initial conditions including at least one of controlling a plurality of field components of the power grid or sending information for controlling the plurality of field components, wherein controlling the plurality of field components includes opening a plurality of breakers, and performing a first iterative process including: performing a balancing operation that includes determining if a frequency of a black start generator of the power grid meets generator criteria, determining if a voltage of a generator voltage bus of the power grid meets bus criteria, or determining if an MW of an isochronous generator of the power grid meets MW criteria, performing a study operation that includes identifying at least a first breaker and a second breaker of the plurality of breakers on a path to a target of the power grid, analyzing the effect of closing the first breaker on the power grid, and analyzing the effect of closing the second breaker on the power grid with the first breaker closed, performing a control operation that includes controlling at least one transmission breaker that is the first breaker or the second breaker to close or sending information for controlling the at least one transmission breaker to close, or controlling at least one distribution breaker that is the first breaker or the second breaker to close or sending information for controlling the at least one distribution breaker to close to add load to the power grid, and performing an evaluation operation that includes determining if closing the at least one transmission breaker or the at least one distribution breaker causes the power grid to operate outside of the generator criteria, the bus criteria, or the MW criteria. The method also includes performing a second iterative process including using the first iterative process to expand a plurality of energized islands of the power grid, and performing a synchronization operation that combines the plurality of expanded energized islands when synchronization criteria based on the generator criteria, the bus criteria, or the MW criteria are met.

In another aspect, the present disclosure is directed to a system for controlling power restoration of a power grid. The system includes a controller configured to control a plurality of field components of the power grid, at least one module comprising computer-executable code stored in non-volatile memory, and a memory for storing instructions, wherein the controller executes the instructions. The controller causes the system to set initial conditions on the power grid based on a combined model of the power grid, setting the initial conditions including at least one of controlling the plurality of field components of the power grid or sending information for controlling the plurality of field components, wherein controlling the plurality of field components includes opening a plurality of breakers, and perform a first iterative process including performing a balancing operation that includes determining if a frequency of a black start generator of the power grid meets generator criteria, determining if a voltage of a generator voltage bus of the power grid meets bus criteria, or determining if an MW of an isochronous generator of the power grid meets MW criteria, performing a study operation that includes identifying at least a first breaker and a second breaker of the plurality of breakers on a path to a target of the power grid, analyzing the effect of closing the first breaker on the power grid, and analyzing the effect of closing the second breaker on the power grid with the first breaker closed, performing a control operation that includes controlling at least one transmission breaker that is the first breaker or the second breaker to close or sending information for controlling the at least one transmission breaker to close, or controlling at least one distribution breaker that is the first breaker or the second breaker to close or sending information for controlling the at least one distribution breaker to close to add load to the power grid, and performing an evaluation operation that includes determining if closing the at least one transmission breaker or the at least one distribution breaker causes the power grid to operate outside of the generator criteria, the bus criteria, or the MW criteria. The controller also causes the system to perform a second iterative process including using the first iterative process to expand a plurality of energized islands of the power grid, and performing a synchronization operation that combines the plurality of expanded energized islands when synchronization criteria based on the generator criteria, the bus criteria, or the MW criteria are met.

DETAILED DESCRIPTION AND INDUSTRIAL APPLICABILITY

Figure 1:
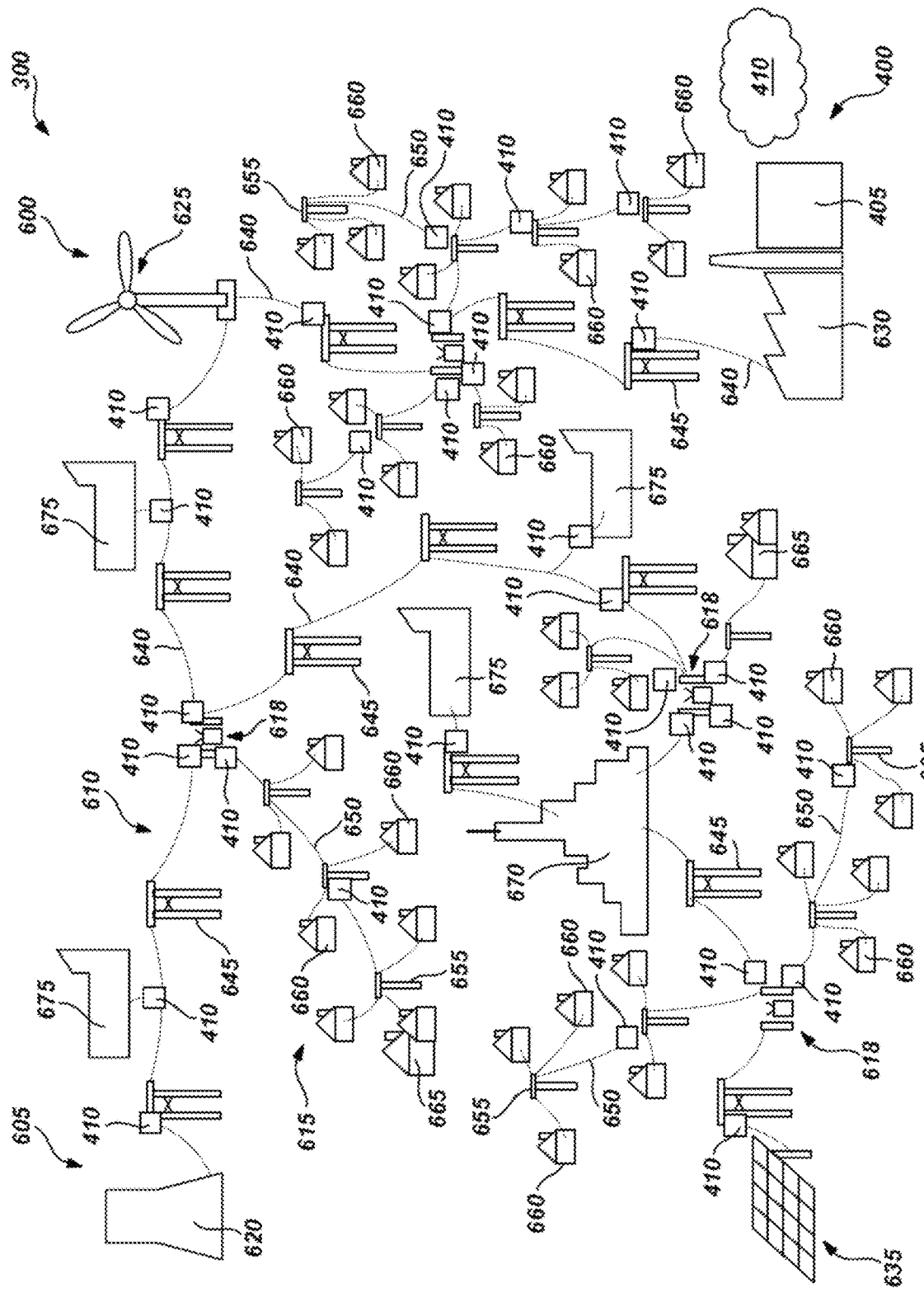
FIG. 1 is a schematic illustration of an exemplary system of the present invention.

As illustrated in FIG. 1, an exemplary disclosed system 300 may include a power restoration system that may operate to restore power operation (e.g., a power generating, transmitting, and distribution capability) of a power system. As illustrated in FIG. 1, system 300 may include a restoration system 400 for restoration of a power system 600.

Power system 600 may be any suitable system for generating, transmitting, and distributing electric power. Power system 600 may include a power grid including a network of electrical components designed to provide electrical service to a specific area or region (e.g., the "grid"). Power system 600 may include a generation subsystem 605, a transmission subsystem 610, and a distribution subsystem 615. Transmission subsystem 610 may transmit electric power generated by generation subsystem 605 to distribution subsystem 615, which may distribute the electric power to users (e.g., power grid customers).

As illustrated in FIG. 1, generation subsystem 605 may include one or more generators that may be any suitable generators (e.g., power plants) for generating electric power. Generation subsystem 605 may include one or more renewable energy generators such as, for example, one or more wind turbines, utility-scale solar farms, geothermal power plants (e.g., including turbines turned by flowing water), biofuel power plants, geothermal power plants, biomass power plants, hydroelectric power plants (e.g., wave and tidal power plants), and/or any other suitable type of renewable power plant. One or more generators may be started without support from other components of system 300 and/or may remain energized without connection to the remainder of system 300 (e.g., may be a black start unit). One or more generators may be a danger unit that may have a fuel supply that may have a generating capacity that may be associated with a fuel source (e.g., that may stop operating based on an imminent loss of a fuel source) such as, for example, fossil fuels such as oil or gas (e.g., for a fossil fuel power plant), or loss of sun power due to cloud cover or sunset (e.g., for a solar power plant). One or more generators may be a quick start unit that may be started in a relatively short period of time (e.g., about 10 minutes or any other suitable time) relative to other generating units. Generation subsystem 605 may include one or more nuclear power plants. Generation subsystem 605 may include one or more fossil fuel power plants such as, for example, one or more oil-fired power plants, natural gas-fired power plants, coal-fired power plants, and/or any other suitable type of fossil fuel power plant. For example, generation subsystem 605 may include a nuclear power plant 620, a wind power plant 625, a fossil fuel power plant 630, a solar power plant 635, and/or any other suitable generators (e.g., power plants) for example as described herein.

As illustrated in FIG. 1, electric power generated by generation subsystem 605 may be transmitted in (e.g., within and/or throughout) power system 600 via transmission subsystem 610. Transmission subsystem 610 may include any suitable components and/or structures for transmitting electric power (e.g., high voltage electric power) such as high voltage power lines and transmission towers. For example, transmission subsystem 610 may include a plurality of power lines 640 (e.g., high voltage power lines) and transmission towers 645.

As illustrated in FIG. 1, transmission subsystem 610 may transmit electric power to distribution subsystem 615 that may be located within and/or throughout power system 600. Distribution subsystem 615 may include any suitable components for distributing electric power such as power lines (e.g., low voltage power lines), utility poles, and/or underground electric lines. For example, distribution subsystem 615 may include a plurality of low voltage power lines 650 and utility poles 655. Distribution subsystem 615 may also include distributed generation components (e.g., generators that may be connected to the distribution system and that may also be controlled by the exemplary disclosed system).

As illustrated in FIG. 1, a plurality of substations 618 may transfer electric power between transmission subsystem 610 and distribution subsystem 615 (e.g., and/or generation subsystem 605). Substation 618 may operate to transform and transfer electricity to different voltages. Substation 618 may include transformers including load tap changing transformers for example as further described below.

Electric power users (e.g., customers) may receive (e.g., and/or contribute) electric power to and from power system 600 via distribution subsystem 615 and/or directly from transmission subsystem 610. For example, power users such as buildings 660 (e.g., residential or commercial buildings such as stores or residential homes), large structures 665 (e.g., commercial buildings such as malls or shopping centers, apartment buildings, or other structures), built-up areas 670 (e.g., urban areas), work areas 675 (e.g., factories, data centers, distribution centers, and/or any other work areas), and/or any other suitable power users may receive electric power via distribution subsystem 615 and/or directly from transmission subsystem 610. The exemplary disclosed electric power users may place load (e.g., demand for electric power) on power system 600.

Restoration system 400 may be any suitable system for restoring power to power system 600. Restoration system 400 may include components integrated into power system 600 such as, for example, control field components. Restoration system 400 may include one or more controllers 405 (e.g., a central control station) and one or more restoration control modules for controlling and/or providing information for controlling a plurality of control field components 410. Controller 405 may control and/or be used to provide instructions for control of control field components 410.

Controller 405 may include systems (e.g., computer systems) for supervisor control and data acquisition (SCADA) used for controlling system 300. In at least some exemplary embodiments, controller 405 may be a central control station. Controller 405 may include one or more controllers and computer systems similar to as described below regarding FIG. 13. The exemplary disclosed controller may include for example a processor (e.g., micro-processing logic control device) or board components. In at least some exemplary embodiments, controller 405 may control system 300 to perform the exemplary disclosed method of power restoration. Controller 405 may include one or more computer keyboard and monitor (e.g., desktop or laptop) stations, touchscreen devices (e.g., of a smartphone, a tablet, a smartboard, and/or any suitable computer device), and/or any other suitable computer systems and user interfaces (e.g., including components and/or configured to work with components described below regarding FIGS. 13 and 14). Controller 405 may include one or more displays (e.g., a computing device display, a touchscreen display, and/or any other suitable type of display) that may provide output, image data, and/or any other desired output or input prompt to one or more users of system 300. For example, the exemplary disclosed display may include a graphical user interface to facilitate entry of input by a user and/or receiving output such as textual information, image data, and/or any other desired output.

Restoration system 400 may include one or more restoration control modules for performing the exemplary disclosed operations such as, for example, the exemplary disclosed restoration control module illustrated in FIG. 2 and described further below. The one or more exemplary disclosed restoration control modules may be stored and operated on any suitable component or components of system 300. The exemplary disclosed restoration control module may include computer-executable code stored in non-volatile memory. System 300 may also include one or more storages (e.g., buffer storages) for storing data associated with the exemplary disclosed restoration control module, which may include components similar to the exemplary disclosed computing device and network components described below regarding FIGS. 13 and 14. For example, the exemplary disclosed buffer storage may include components similar to the exemplary storage medium and RAM described below regarding FIG. 13. The exemplary disclosed buffer storage may be implemented in software and/or a fixed memory location in hardware of system 300. The exemplary disclosed buffer storage (e.g., a data buffer) may store data temporarily during an operation of system 300.

The one or more exemplary disclosed restoration control modules may include software modules running on components of system 300. The one or more exemplary disclosed restoration control modules may be partially or substantially entirely integrated into components of system 300. The one or more exemplary disclosed restoration control modules may also be partially or substantially entirely located on a server outside of power system 600 and controller 405, and may exchange information with system 300 for controlling the exemplary disclosed power restoration method for example as described below.

The exemplary disclosed components of system 300 may communicate using any suitable communication technique such as wireless or via wire communication. For example, the exemplary disclosed power restoration method may be controlled via wire communication and/or network communication using a network 415 as illustrated in FIG. 1. Network 415 may be the internet, a LAN (e.g., via Ethernet LAN), a WAN, a WiFi network, or any other suitable network. Network 415 may be similar to WAN 201 described below. Also for example, some or substantially all components of system 300 may also be directly connected (e.g., by wire, cable, USB connection, and/or any other suitable electro-mechanical connection) to each other and/or connected via network 415. For example, components of system 300 (e.g., including controller 405) may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 14. Components of system 300 (e.g., including controller 405) may include any suitable communication components for communicating with other components of system 300 using for example the communication techniques described above.

The plurality of control field components 410 may be any suitable components for controlling an energization, de-energization, and/or mode of operation (e.g., Frequency, Megawatt or MW, MVAR or Megavolt ampere reactive, voltages, and/or any other desired characteristic) of electric components of power system 600. For example, control field component 410 may be a generator component for controlling a mode of operation of an exemplary disclosed electric power generator described above.

Control field component 410 may be a breaker such as a transmission breaker or a distribution breaker. For example, control field component 410 may be a transmission breaker that may be used to interrupt a flow of electricity (e.g., current) at transmission level voltages (e.g., high voltages) within transmission subsystem 610. Also for example, control field component 410 may be a distribution breaker that may be used to interrupt a flow of electricity (e.g., current) on a distribution voltage level component (e.g., at relatively low voltages) within distribution subsystem 615. For example, control field component 410 may be a breaker that may be controlled or operated to open to interrupt a flow of electricity and/or to close to allow a flow of electricity. Control field component 410 that may be a breaker may be changed during operation of system 300 by controller 405 or by operators (e.g., based on information provided by controller 405) for example as described herein.

Control field component 410 may be a transformer tap that may be disposed for example at transformers of substations 618 and/or any other suitable components of power system 600 (e.g., that include transformers) and may be used to control the transformer to change system voltage. For example, a location of the transformer tap on the transformer secondary windings may be changed, which effectively changes the voltage. Control field component 410 that may be a transformer tap change during operation of system 300 by controller 405 or by operators (e.g., based on information provided by controller 405).

Control field component 410 may be any desired control component of system 300 that may be located away from (e.g., remote from) controller 405. Control field component 410 may be any suitable electrical component used to operate or control power system 600 that may be located away from (e.g., remote from) controller 405 such as any suitable breaker, transformer tap, relay (e.g., controlled remotely to trip to protect equipment from damage), switch, an exemplary disclosed reactor, a capacitor, a FACTS device (a flexible AC transmission system), tag (e.g., protective devices that prevent a component from being operated by SCADA in order to protect field personnel performing field work), and/or any other suitable components.

The exemplary disclosed system and method may be used in any suitable application for power generation. For example, the exemplary disclosed system and method may be used in any suitable application involving a power grid. The exemplary disclosed system and method may be used in any suitable application for restoration of a power system (e.g., restoring an operation of a power grid).

System 300 may include a combination of individual component data, models, and modules suitable for performing an effective (e.g., safe and reliable) system restoration. Each module along the process path illustrated in FIG. 2 may operate to actively gather and evaluate information to provide control signals to field components and/or companion systems, and/or to provide operating directions to users.

Figure 2:
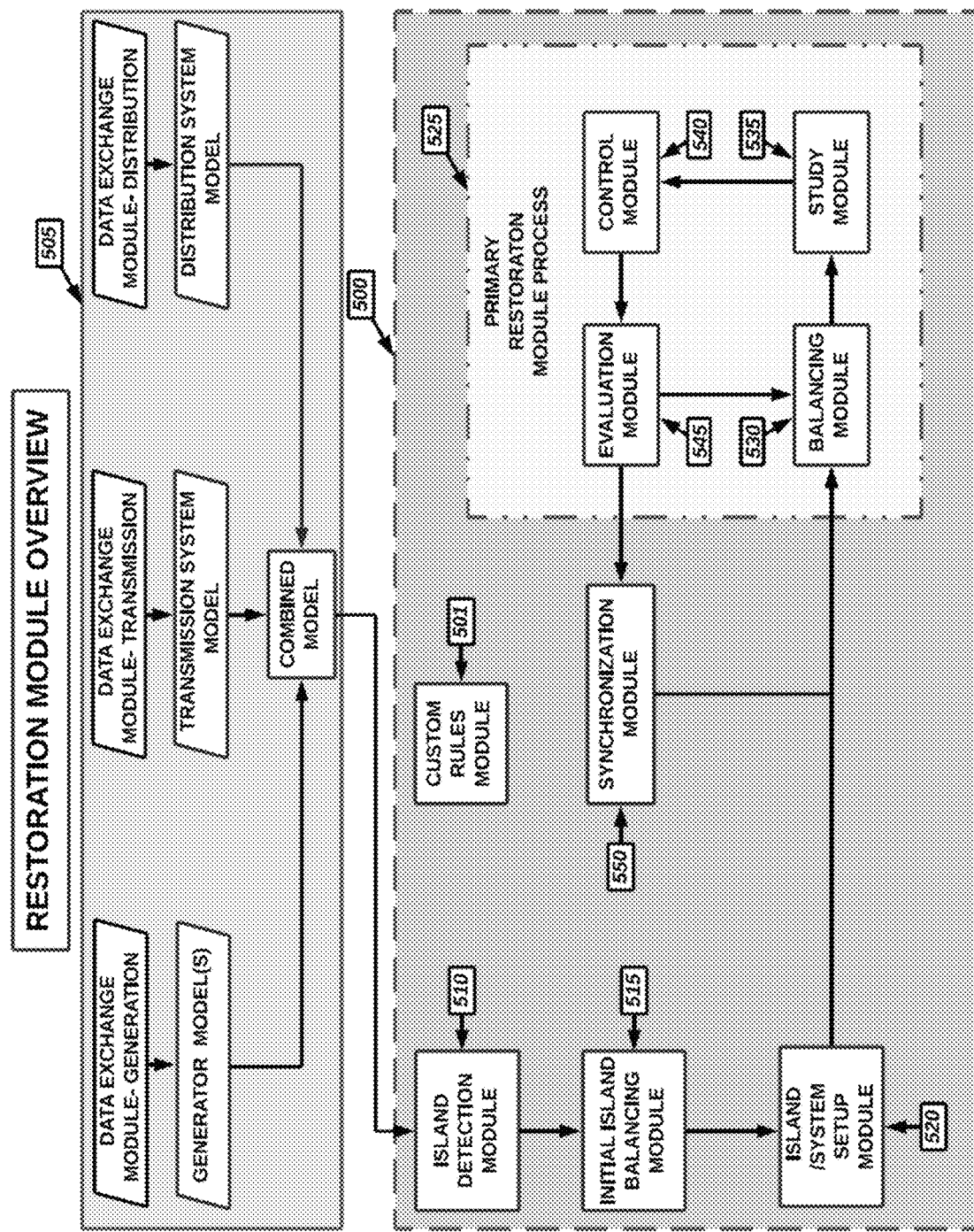
FIG. 2 is a flowchart showing an exemplary process of the present invention.

FIG. 2 illustrates an exemplary embodiment of the exemplary disclosed restoration control module. Restoration control module 500 may utilize data of a model 505 that may be determined (e.g., received and/or compiled) by restoration control module 500. Restoration control module 500 may operate to receive data (e.g., including requesting and/or retrieving data) from existing databases and data sources such as storage associated with controller 405, external databases (e.g., data of power generation, transmission, distribution, and operation entities such as utilities and/or any other organizations, companies, and/or authorities involved in power generation). That is, restoration control module 500 may utilize data of many different sources to compile and update model 505. For example, restoration control module 500 may utilize real-time and near real-time data associated with components (e.g., some or substantially all components) of power system 600 to create model 505. Restoration module 500 may operate to exchange data with generation, transmission, and distribution data sources (e.g., operators and entities) to generate a generator model, a transmission system model, and a distribution system module. Restoration module 500 may operate to create a combined model that may be updated (e.g., including in real-time and/or near real-time) by operation of restoration control module 500 during the operation of system 300 in performing the exemplary disclosed power restoration method.

In at least some exemplary embodiments, system 300 (e.g., restoration control module 500) may integrate data from some or substantially all suitable data sources to be utilized for performing a system restoration. A specific communications structure for data transfer may be varied to suit a given user and/or system (e.g., a given power grid). System 300 (e.g., restoration control module 500) may receive inputs from different systems (e.g., systems that may control transmission, distribution, and generation components). These inputs may include both data and models (e.g., associated with model 505). Once the data is received, system 300 (e.g., restoration control module 500) may operate to perform calculations and issue controls that may be sent as an output to internal or external systems (e.g., signals and/or data for controlling field components 410 and/or information to be output to operators for controlling field components 410). Model 505 may create a topology and integrated status (e.g., integrated picture) to be used for performing this task based on how a given power system is modelled and also how it is actually configured.

Figure 3:
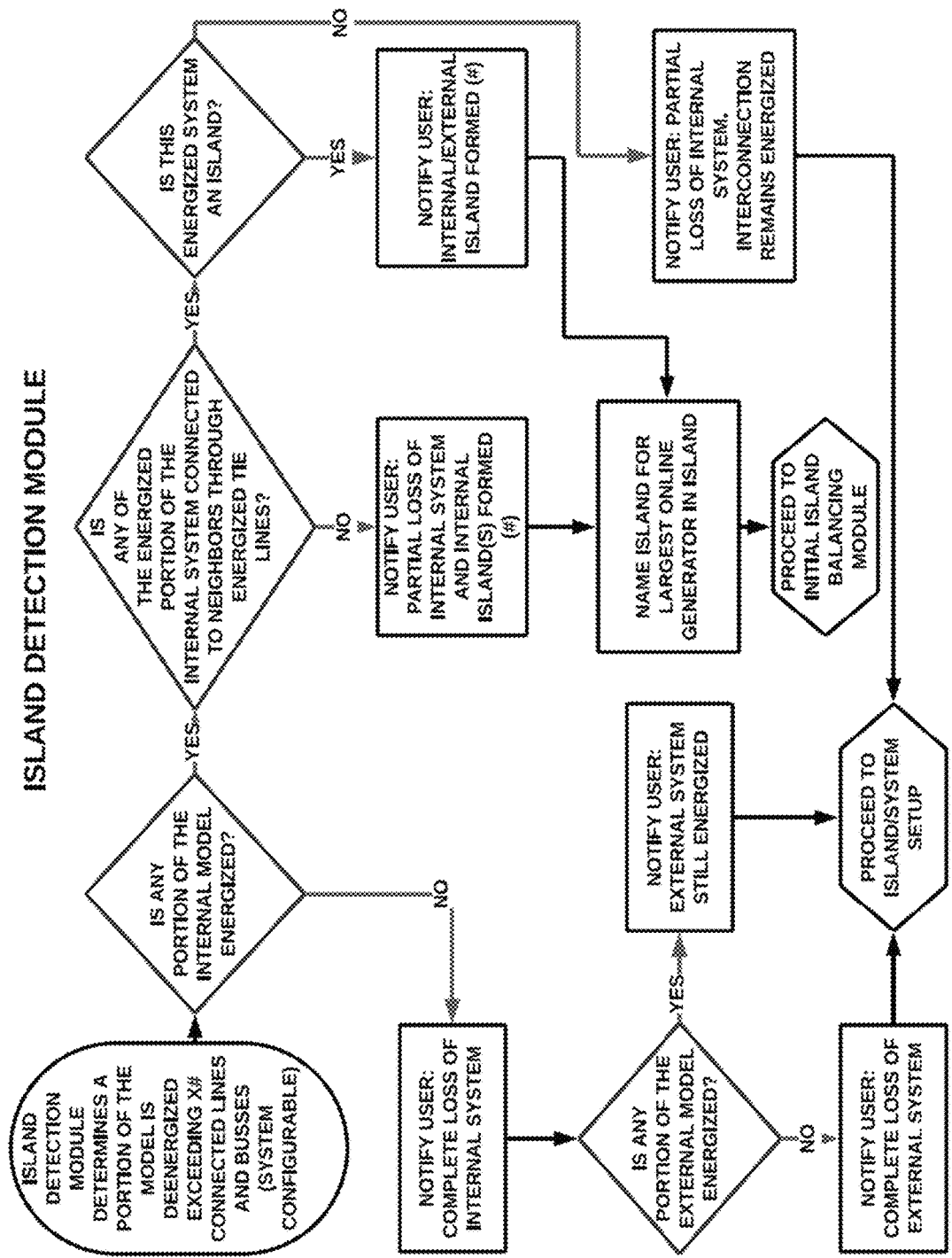
FIG. 3 is a flowchart showing an exemplary process of the present invention.

As illustrated in FIG. 2, restoration control module 500 may include an island detection module 510. When a separation or complete shutdown occurs in power system 600 (e.g., the power grid), alarms and information may be presented to operators via controller 405 (e.g., SCADA control systems). In order to substantially prevent the alarms and information from becoming overwhelming to operators of system 300, island detection module 510 may operate to quickly calculate and assess system conditions to present summary information to operators to assess an extent and severity of a disturbance to the power grid (e.g., thus reducing confusion in these scenarios). Island detection module 510 may serve as a monitor that may constantly analyze system data and models (e.g., the exemplary disclosed combined model) to determine system conditions. Island detection module 510 may detect whether substantially all of power system 600 (e.g., the power grid) or a portion of the power grid has been deenergized and provides that feedback (e.g., summarized information) to a user. Additionally, island detection module 510 may analyze if portions of power system 600 remain energized and whether power system 600 may be operating islanded (e.g., separate portions or "islands" of energized areas of the power grid or as part of a larger interconnection). The operation of island detection module 510 (e.g., and restoration control module 500) may thereby substantially prevent these energized portions or islands from failing due to imbalances as described herein. Island detection module 510 may identify islands of energized areas of the power grid relatively quickly (e.g., in seconds) and provide this data to the other exemplary disclosed modules described below. Island detection module 510 may operate to simultaneously identify multiple energized islands and provide summarized and coherent information to operators of system 300. FIG. 3 is a flowchart illustrating an exemplary embodiment of a process of operation of island detection module 510.

Figure 4:
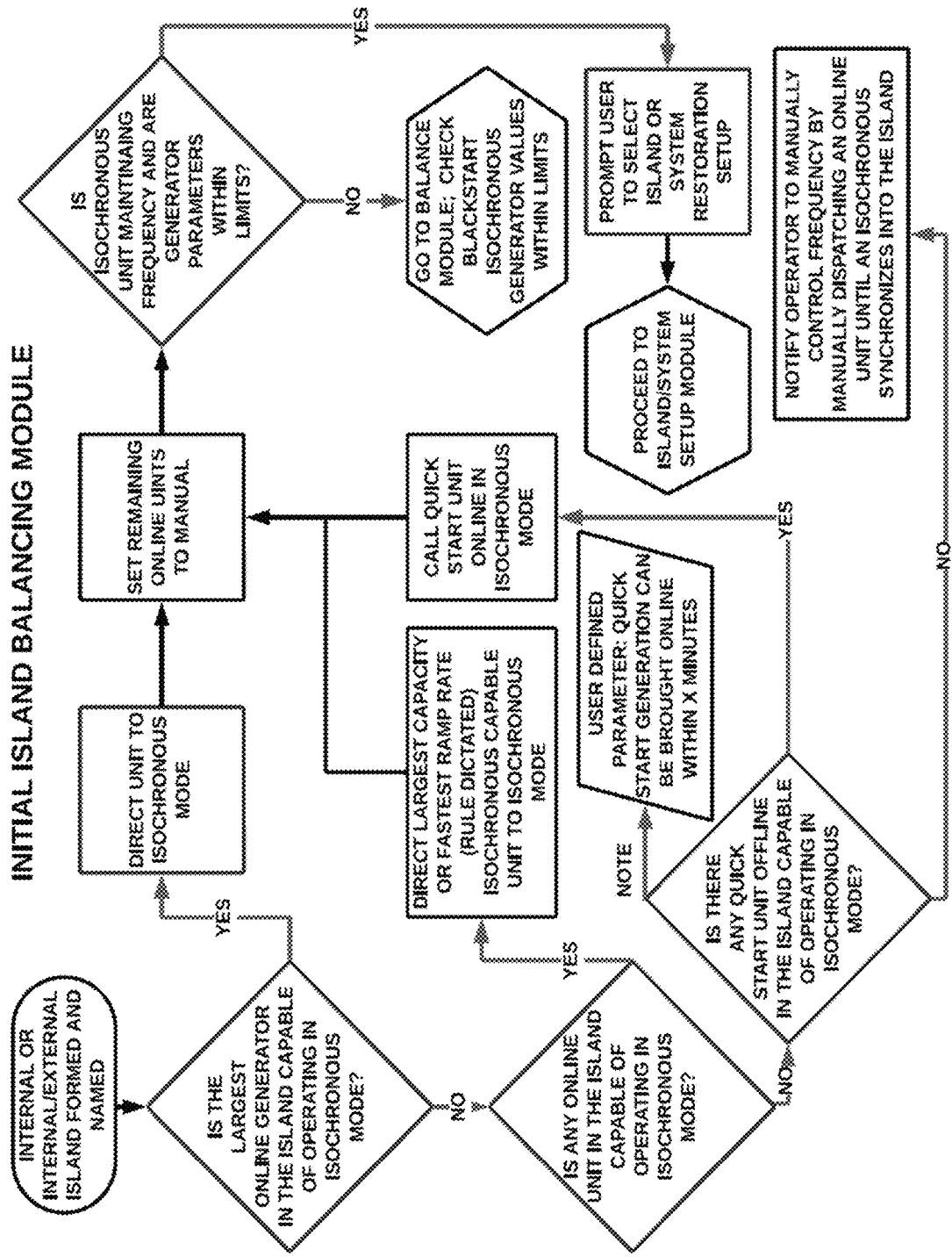
FIG. 4 is a flowchart showing an exemplary process of the present invention.

Returning to FIG. 2, restoration control module 500 may also include an initial island balancing module 515. If island detection module 510 has determined that a portion of the electrical grid has remained energized as described above, initial island balancing module 515 may operate to allow operators to balance generation and load within the identified energized islands (e.g., remaining islands of the power grid that are energized). Initial island balancing module 515 may operate to quickly analyze the situation (e.g., the exemplary disclosed model and information provided by island detection module 510) and provide information (e.g., directions) to operators to take actions (e.g., including operating control field components 410) to balance generation and load. For example, initial island balancing module 515 may operate to analyze data associated with restoration control module 500 to determine suitable actions for operators to perform. Initial island balancing module 515 may operate to analyze capabilities of power generation within surviving islands (e.g., energized portions of the power grid), which restoration control module 500 may use to perform control of control field components 410 (e.g., send signals to control) and/or provide information (e.g., directions) to operators for controlling control field components 410 to stabilize power generation and load balance within the one or more energized islands. FIG. 4 is a flowchart illustrating an exemplary embodiment of a process of operation of initial island balancing module 515.

Figure 5A:
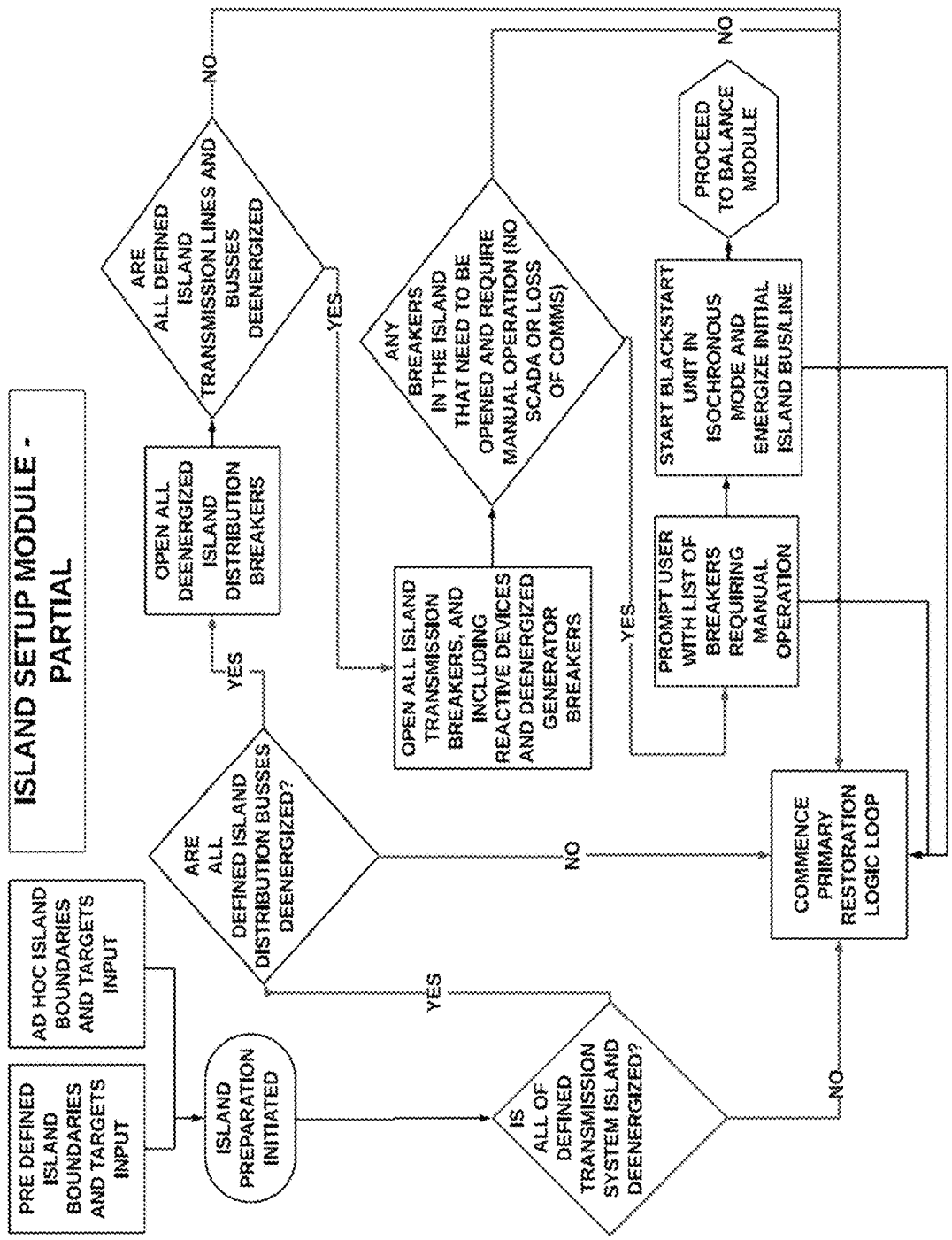
FIGS. 5A and 5B are flowcharts showing an exemplary process of the present invention.
Figure 5B:
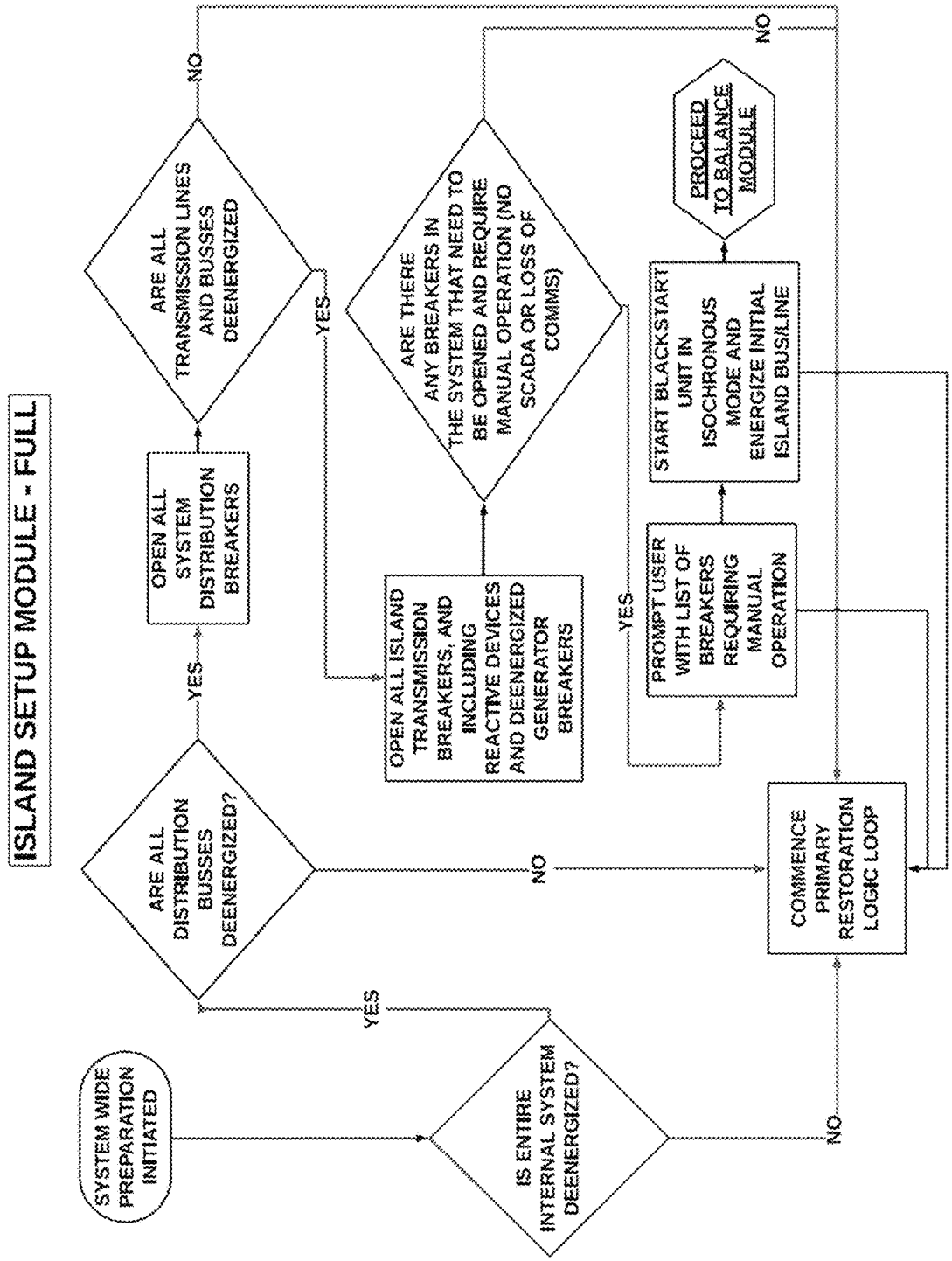
Figure 6A:
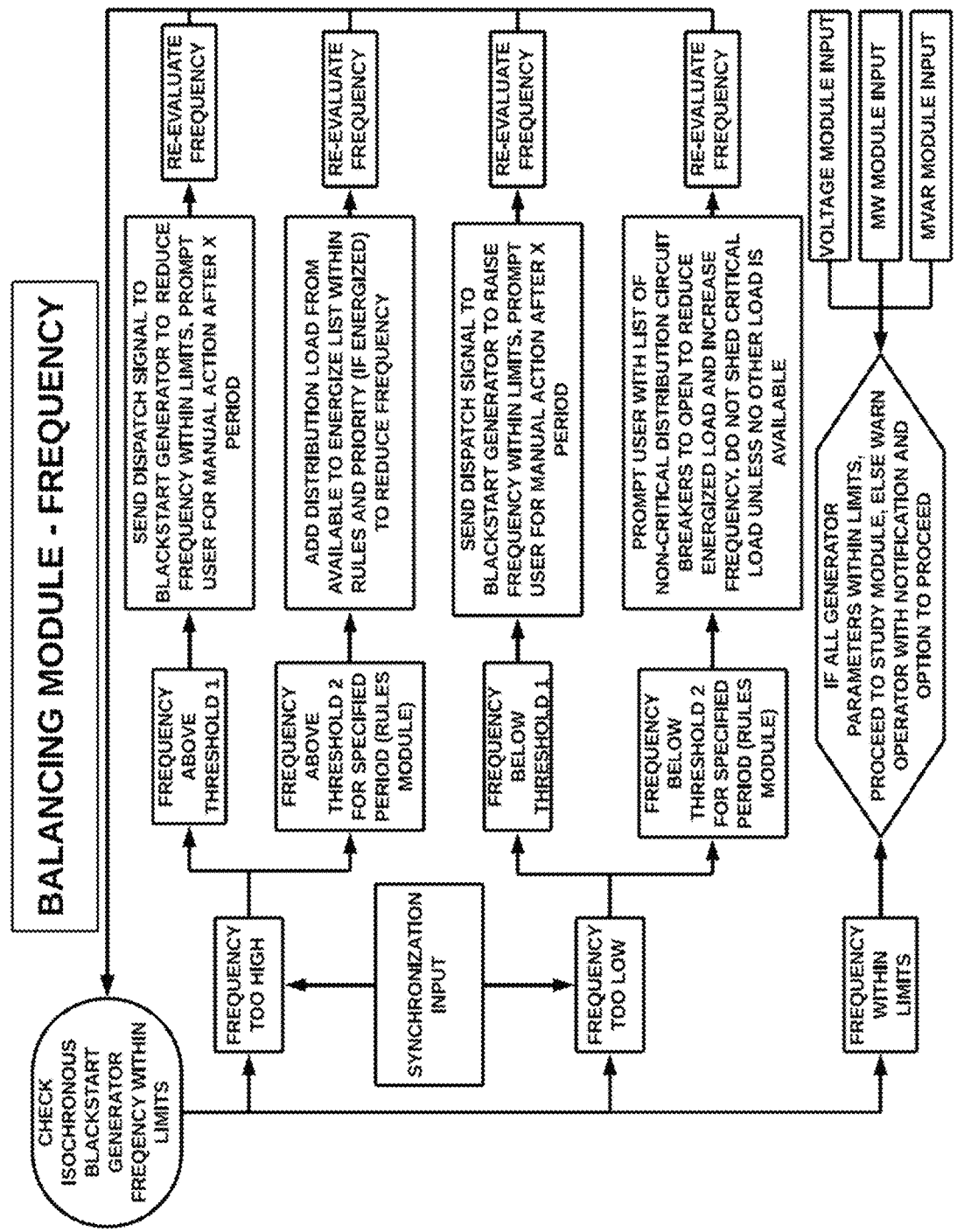
FIGS. 6A, 6B, 6C, 6D, 6E, 6F, and 6G are flowcharts showing an exemplary process of the present invention.
Figure 6B:
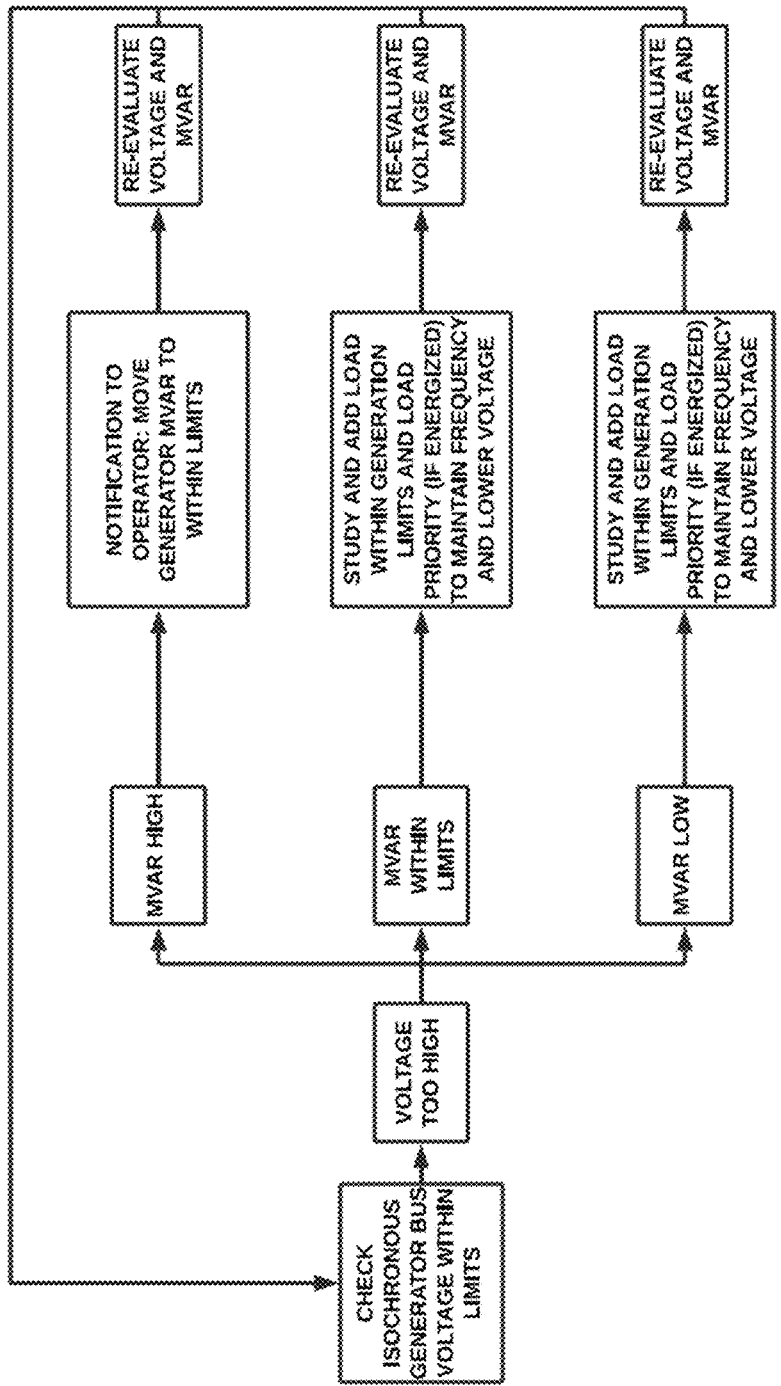
Figure 6C:
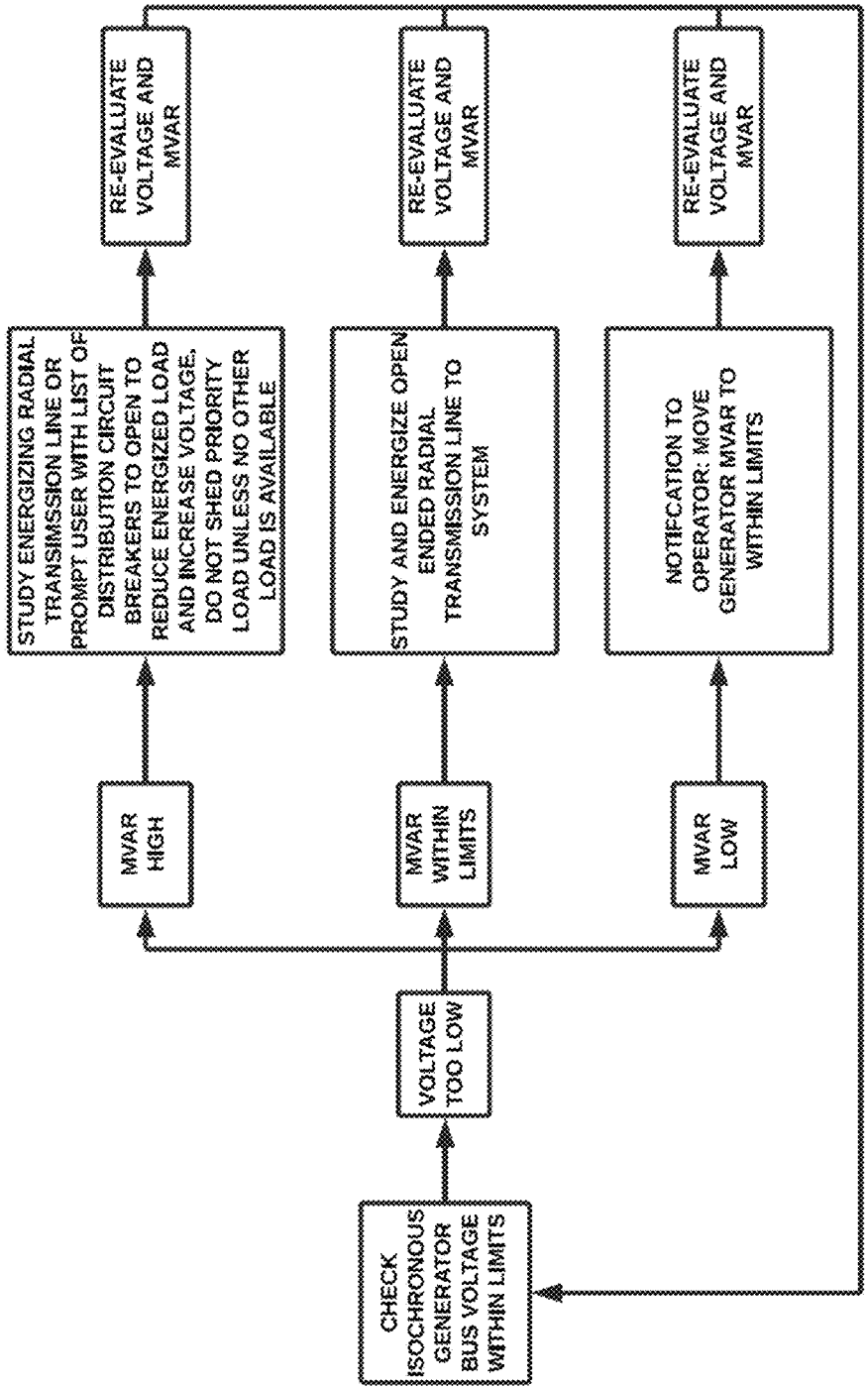
Figure 6D:
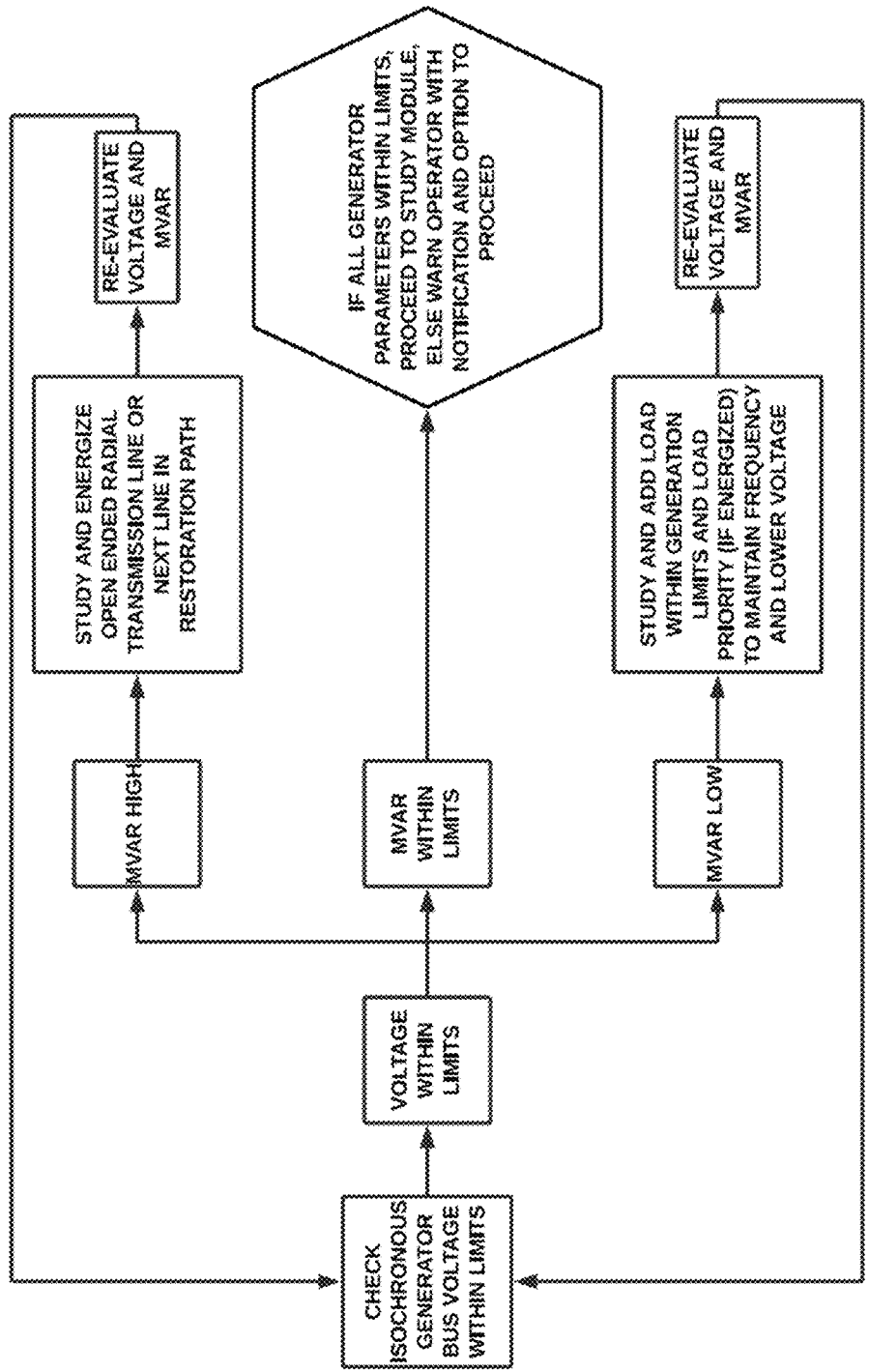
Figure 6E:
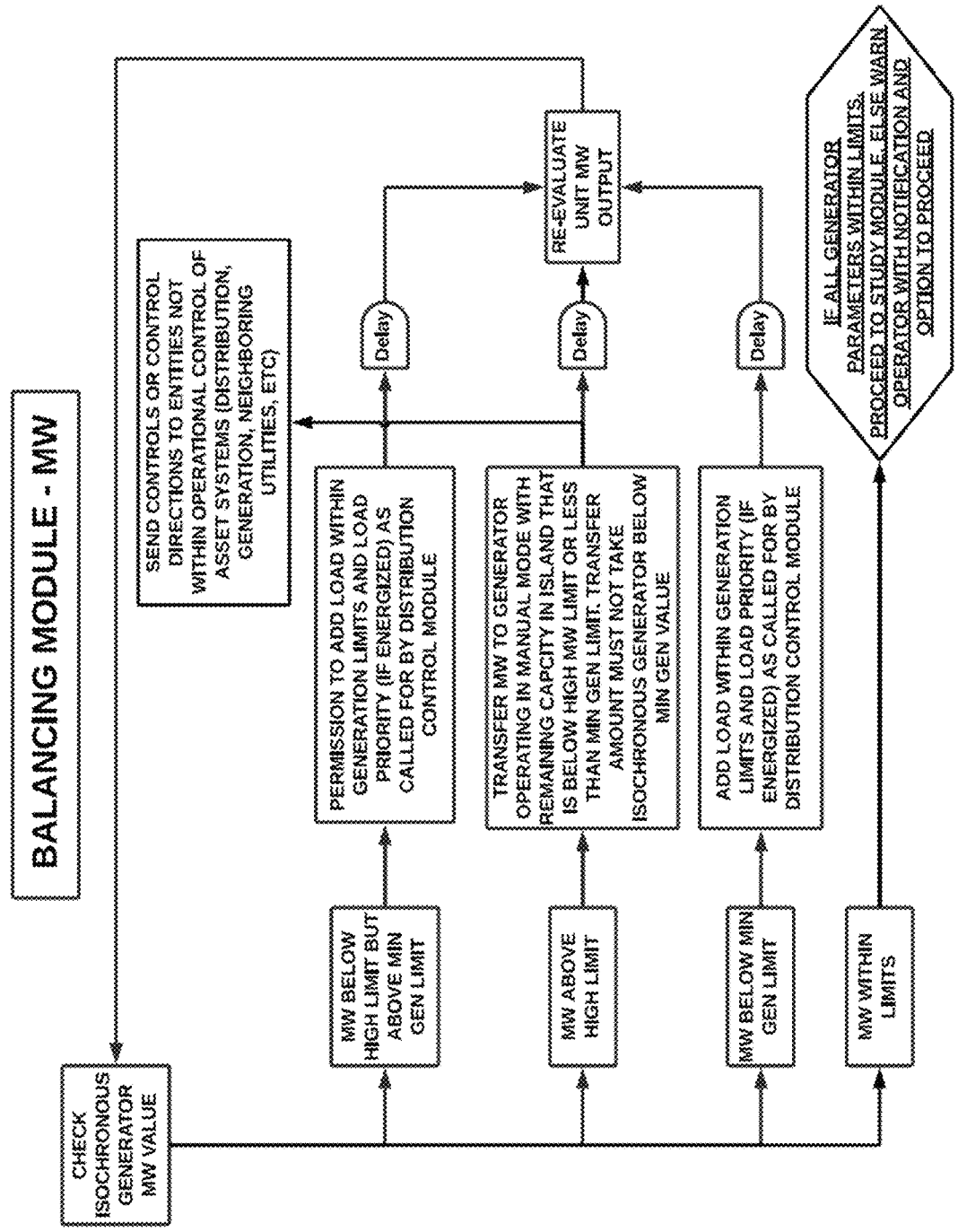
Figure 6F:
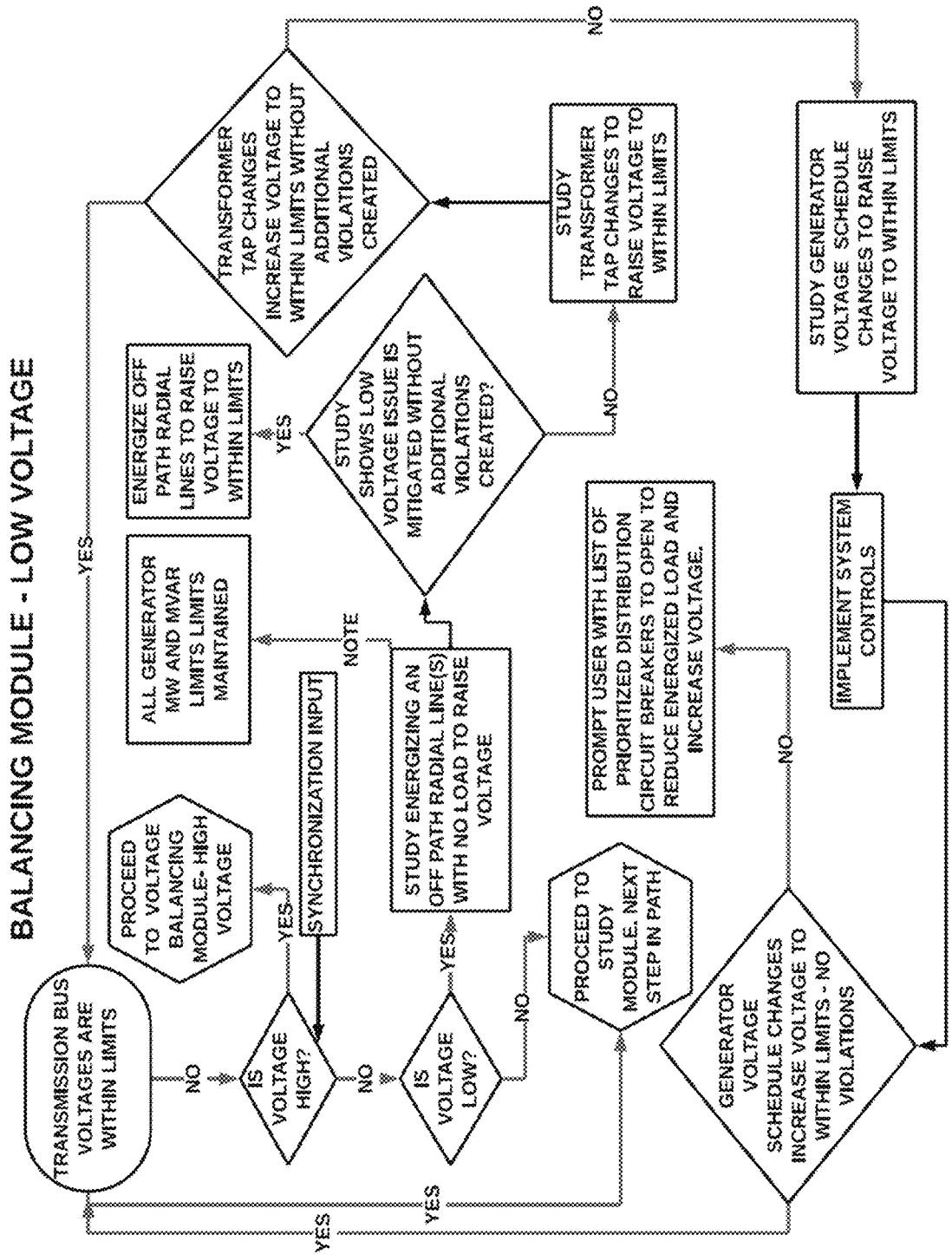
Figure 6G:
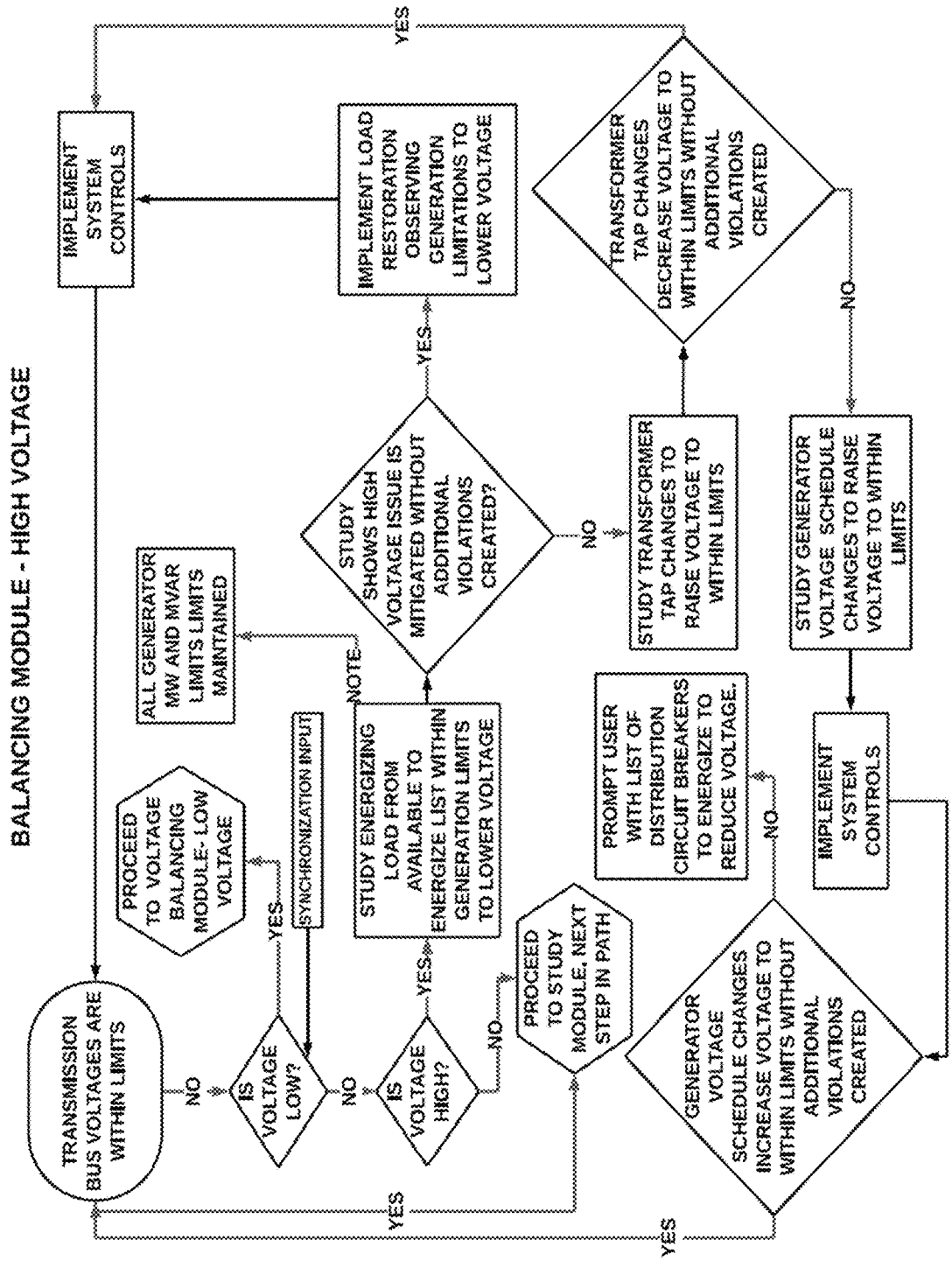

Returning to FIG. 2, restoration control module 500 may also include an initial island setup module 520. Initial island setup module 520 may determine and establish initial conditions for restoring power to power system 600. Initial island setup module 520 may operate to configure the power grid (e.g., including controlling or providing information for the control of control field components 410) so that system power restoration may begin. The exemplary disclosed initial conditions may include controller 405 controlling one or more control field components 410 and/or providing instructions to operators of system 300 for control of one or more control field components 410. For example, one or more control field components 410 that may be breakers may be opened to allow for a controlled restoration of power system 600 (e.g., one or more islands) and/or to remove specific components from service so that restoration may commence. Restoration control module 500 may thereby provide for establishing restoration conditions on a system-wide basis or a predefined island basis (e.g., strengthening one or more islands for example as described below). For example, a system-wide approach may prepare an entire power system 600 for restoration at once (e.g., power restored to substantially all components). The predefined island approach may prepare smaller portions of power system 600 to be restored as individual islands. Many of these operations may be defined in the exemplary disclosed custom rules module described below, which may allow for system-specific criteria to be addressed by restoration control module 500. FIGS. 5A and 5B are flowcharts illustrating an exemplary embodiment of a process of operation of initial island setup module 520.

Returning to FIG. 2, restoration control module 500 may include a custom rules module 501. Custom rules module 501 may operate to process system-specific rules (e.g., of model 505), which may include criteria, rules, and data of individual regions, companies, and interconnections, including, for example, specific operating parameters to be filed for a given power grid during both normal and restoration operations. Custom rules module 501 may be customized (e.g., at the direction of those entities) to provide for system-specific operating instructions to be incorporated into the logic of restoration control module 500. As an illustrative example, a company may have instructions that a generator such as a specific combined cycle generator is to be placed in service prior to energizing a given transmission line. A custom rules engine of custom rules module 501 may operate to enforce this logic during the restoration process. Other (e.g., substantially any other) system-specific parameters that vary from a primary process of restoration control module 500 may be incorporated into custom rules module 501 for integration into the process of system 300.

As illustrated in FIG. 2, a primary restoration module process 525 may provide an algorithm (e.g., logic loop) that may provide power system restoration to proceed once the initial conditions have been set as described above in initial island setup module 520. Primary restoration module process 525 may be a first iterative process including operation of a plurality of modules (e.g., several sub-modules). The sub-modules may be looped to balance, study, control, and then evaluate at each step of primary restoration module process 525. Primary restoration module process 525 may include a balancing module 530, a study module 535, a control module 540, and an evaluation module 545. The exemplary disclosed logic loop may continue throughout the exemplary disclosed restoration process performed by system 300 to provide for system 300 to be maintained in balance as power is restored. In one illustrative example, system 300 may operate to study (e.g., analyze) effects of a proposed operation of a given control field component 410 (e.g., a closing of a breaker). If system 300 does not identify issues (e.g., problems such as imbalance or overloading of system 300) in the study (e.g., analysis), system 300 may operate to issue controls to that control field component 410 (e.g., control with signals or data or issue instructions to an operator for control of that control field component 410). Once that control field component 410 has been closed, system 300 may then analyze (e.g., evaluate) a result of that control. If system 300 identifies issues or problems, system 300 may issue additional controls to correct them. If no issues are detected by system 300, system 300 may operate to rebalance the system and may begin the exemplary disclosed logic loop of primary restoration module process 525 again. For example, once island generation is balanced, system 300 may then analyze (e.g., study) a next move in the process (e.g., a next control field component 410 to be controlled). Primary restoration module process 525 may continue until substantially all system components of power system 600 have been restored or a pause point is initiated by another module of restoration control module 500 such as custom rules module 501 and/or the exemplary disclosed synchronization module described below.

As illustrated in FIG. 2, balancing module 530 may operate to provide generator balancing and voltage balancing. Balancing module 530 may continuously monitor power generation and load to provide balancing between them, as well as monitoring and balancing voltage, throughout the exemplary disclosed process of power restoration.

Regarding generator balancing, balancing module 530 may monitor power generation and load so that power generation may remain balanced (e.g., tightly balanced) with loading on power system 600 (e.g., on energized islands of power system 600) throughout the exemplary disclosed process of system power restoration. This balance may be fragile during system restoration due to a lack of generation resources (e.g., of generation subsystem 605) and inertia on the grid. Balancing module 530 may operate based on algorithms (e.g., logic) that may provide for balance between generation and load being suitably managed. For example, balancing module 530 (e.g., by using model 505 and other inputs and data associated with system 300) may analyze generators of generation subsystem 605 energized on system 300 to determine where and in what mode each generator should be operating. As the energized system continues to expand, the Frequency, MW, MVAR, and voltages (e.g., and any other suitable parameters) of generators connected to the grid may be closely monitored by balancing module 530 and controlled by restoration system 400. Balancing module 530 may continuously (e.g., constantly) monitor these exemplary disclosed parameters and either directly control one or more control field components 410 (e.g., via signals and/or data) and/or make recommendations to operators (e.g., by providing output to operators such as via displays of user interfaces) to facilitate expansion of energization of the grid. Balancing module 530 may adjust and correct issues if the exemplary disclosed parameters begin to fall outside of recommended ranges. Balancing module 530 may thereby reduce a probability of or substantially prevent the power grid from collapsing (e.g., collapsing again) due to imbalances between power generation of the exemplary disclosed generators and load on power system 600. Data and information such as inputs from custom rules module 501 may be integrated into and/or accounted for within balancing module 530 to include regional-specific and system-specific criteria in the balancing analysis. FIGS. 6A through 6G are flowcharts including an exemplary embodiment of a process of operation of generator balancing of balancing module 530.

Regarding voltage balancing, balancing module 530 may monitor fluctuation of voltages during system power restoration, including for example voltage tending to be relatively higher during power restoration due to the Ferranti effect (e.g., a tendency of voltage to rise along a lightly loaded transmission line). By balancing voltage similarly to as described above regarding balancing power generation and load, balancing module 530 may operate to reduce a probability of or substantially prevent damage to equipment of power system 600 and/or complete failure of components for performing the restoration process due to failure to manage high voltages. Also by balancing voltage similarly to as described above regarding balancing power generation and load, balancing module 530 may operate to reduce a probability of or substantially prevent excessive load (e.g., relative to power generation) causing voltages to become excessively low, which may occur when there are insufficient voltage support resources (e.g., the exemplary disclosed generators) operating on power system 600 to support an amount of load being served by power system 600. The voltage balancing process (e.g., logic) of balancing module 530 may operate to monitor voltage (e.g., and/or generation and load) for balancing, and may either directly control one or more control field components 410 (e.g., via signals and/or data) and/or make recommendations to operators (e.g., via providing output to operators such as via displays of user interfaces) to provide suitable maintenance of system voltages (e.g., and/or generation and load) as the exemplary disclosed power restoration process proceeds. FIGS. 6A through 6G include an exemplary embodiment of a process of operation of voltage balancing of balancing module 530.

Returning to FIG. 2, study module 535 may operate to study (e.g., analyze) transmission, generation, and distribution of electric power during the power restoration process. Regarding transmission, study module 535 may calculate a path to a next system target on the transmission system (e.g., transmission subsystem 610) based on defined parameters (e.g., exemplary disclosed parameters described herein) and user's input. Study module 535 may analyze (e.g., study including simulating) the next action and determine whether that action is suitable (e.g., safe) to perform. As system conditions change, study module 535 may constantly re-evaluate whether the path to the target is still viable and may re-calculate the path if suitable, based on the analysis. Additionally, study module 535 may determine additional actions to bolster system parameters and improve system security such as, for example, adding or removing load, energizing radial transmission lines, and/or adjusting transformer taps if suitable. Restoration control module 500 (e.g., study module 535) may either directly control one or more control field components 410 (e.g., via signals and/or data) and/or make recommendations to operators (e.g., via providing output to operators such as via displays of user interfaces) to perform these actions. Power generation study may be similarly performed by evaluation module 545. FIGS. 7A through 7G are flowcharts illustrating an exemplary embodiment of a process of operation of transmission study of study module 535.

Figure 7A:
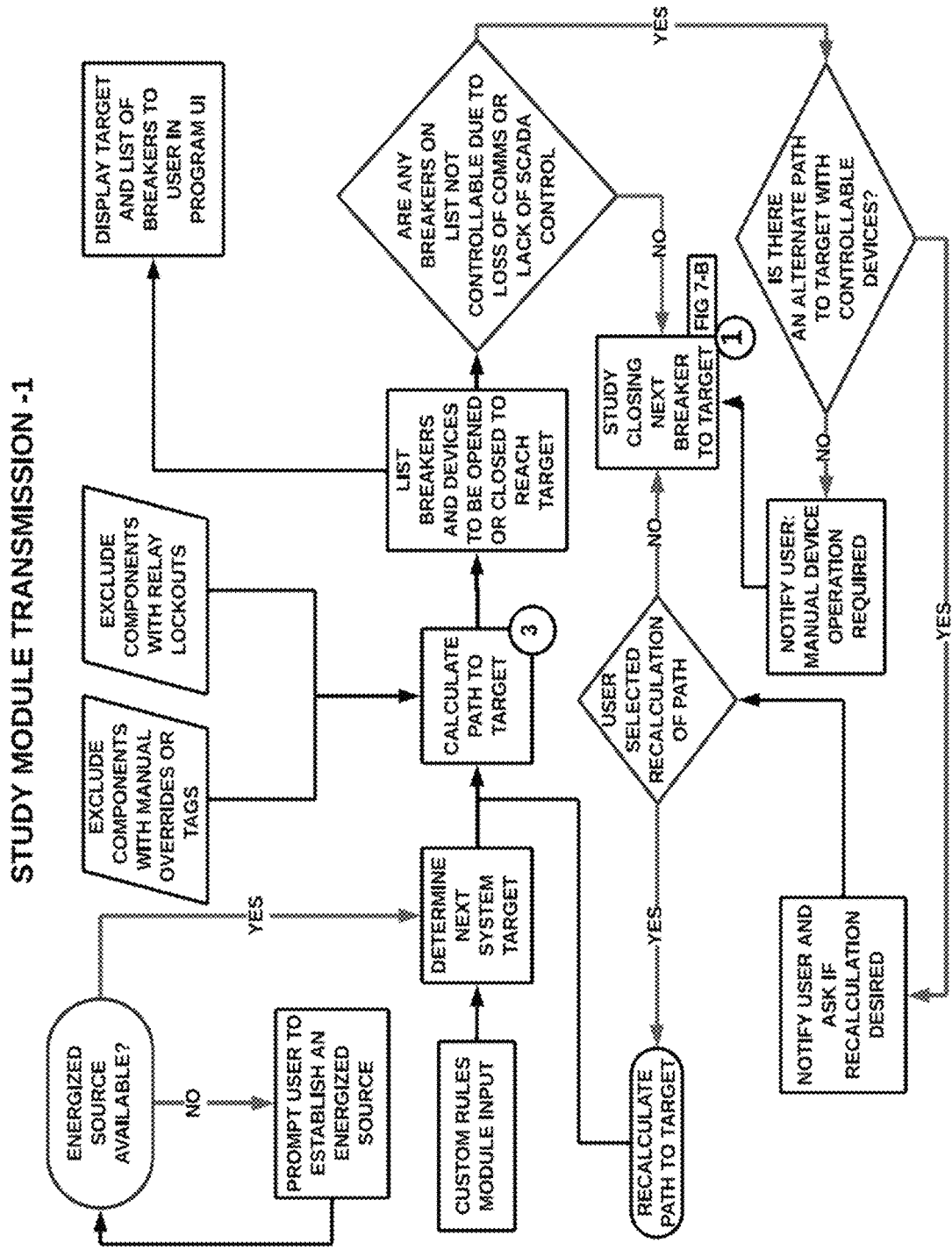
FIGS. 7A, 7B, 7C, 7D, 7E, 7F, and 7G are flowcharts showing an exemplary process of the present invention.
Figure 7B:
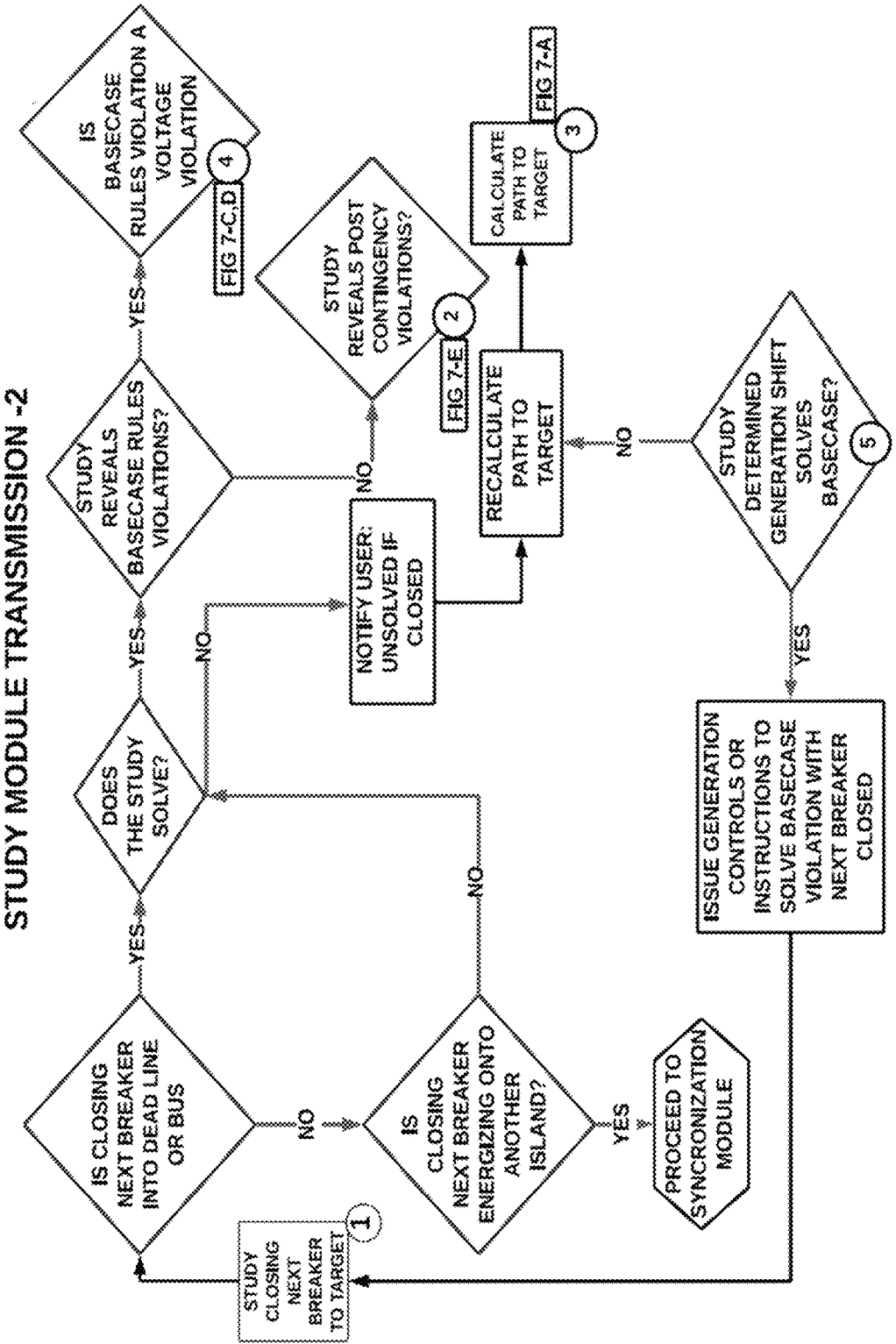
Figure 7C:
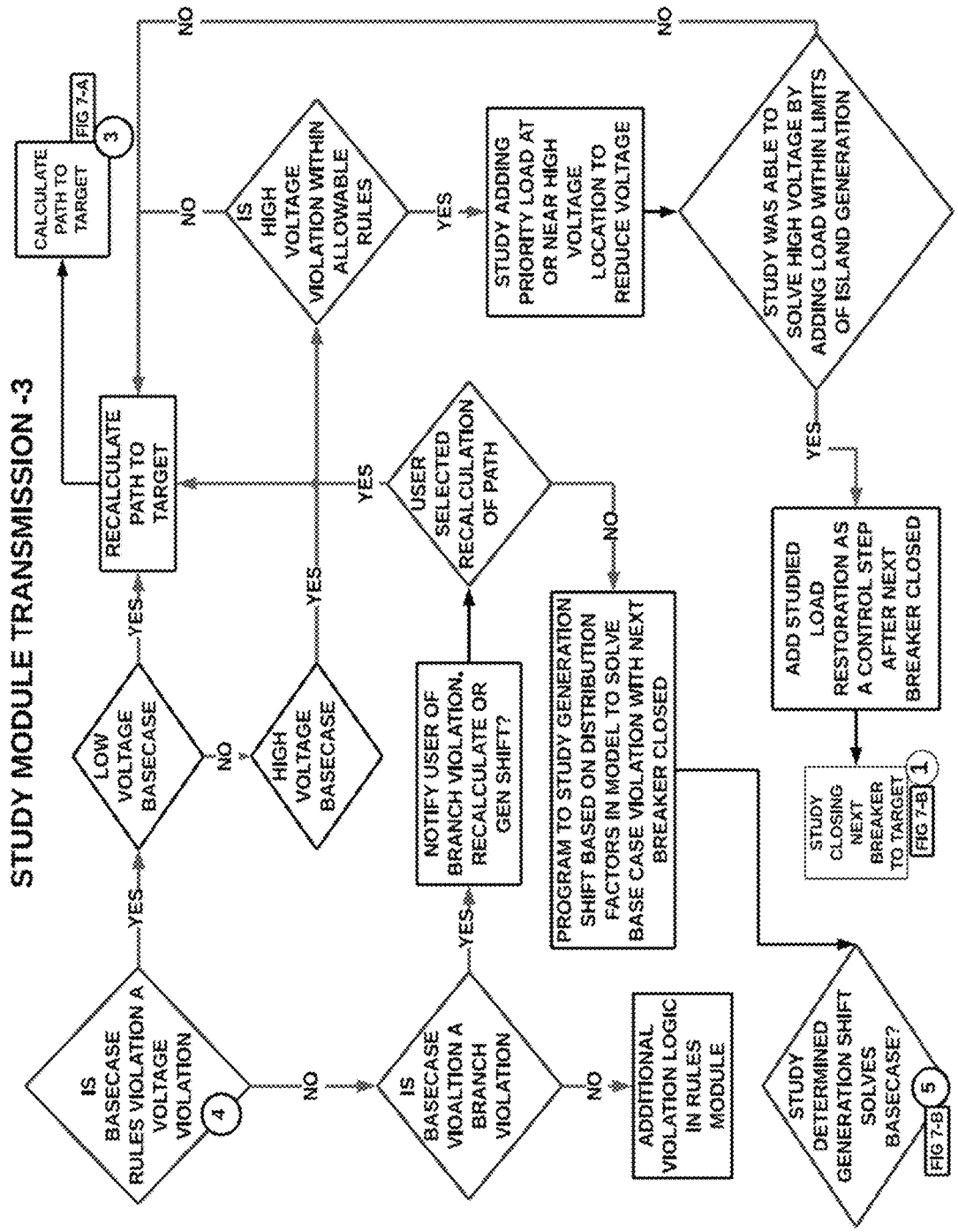
Figure 7D:
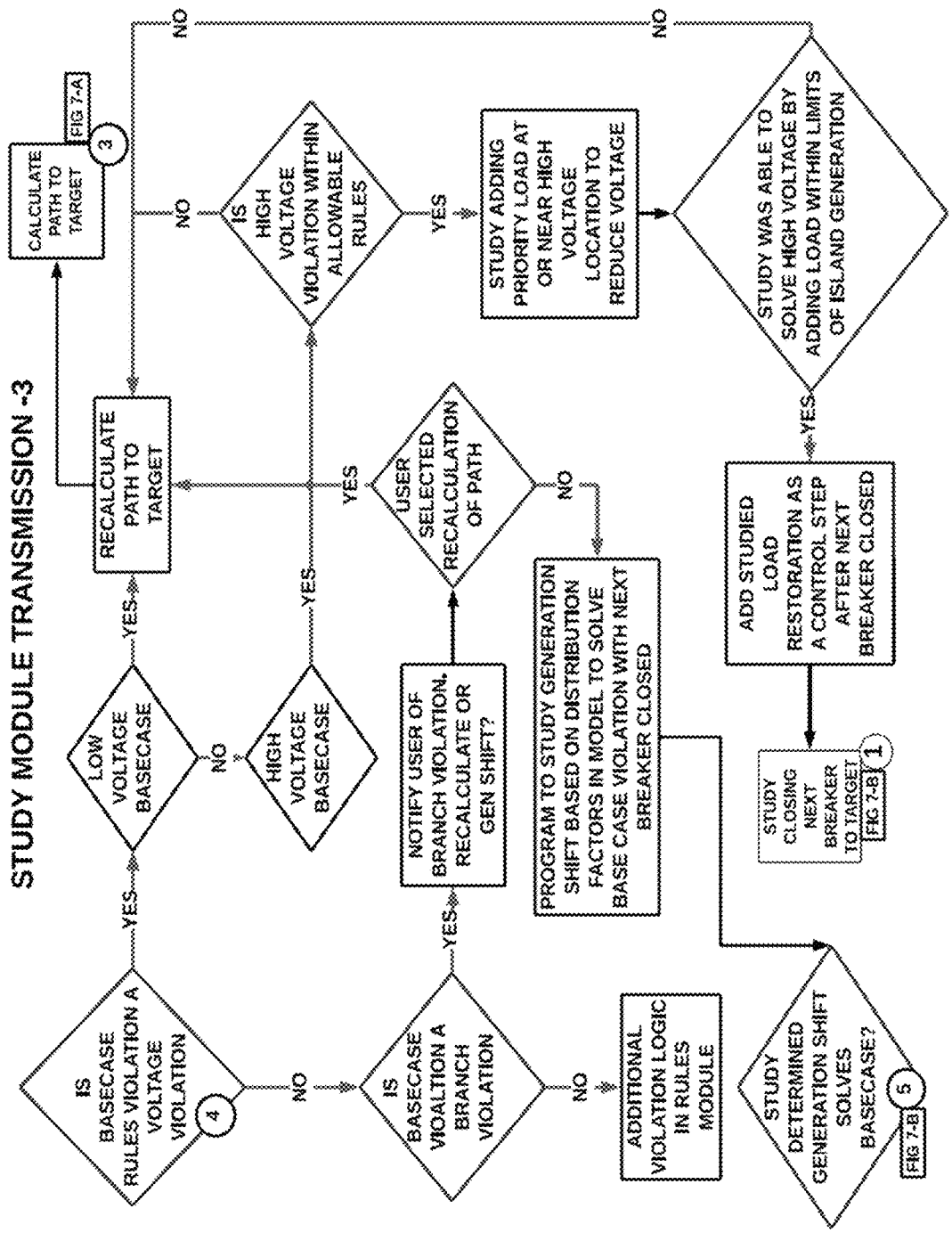
Figure 7E:
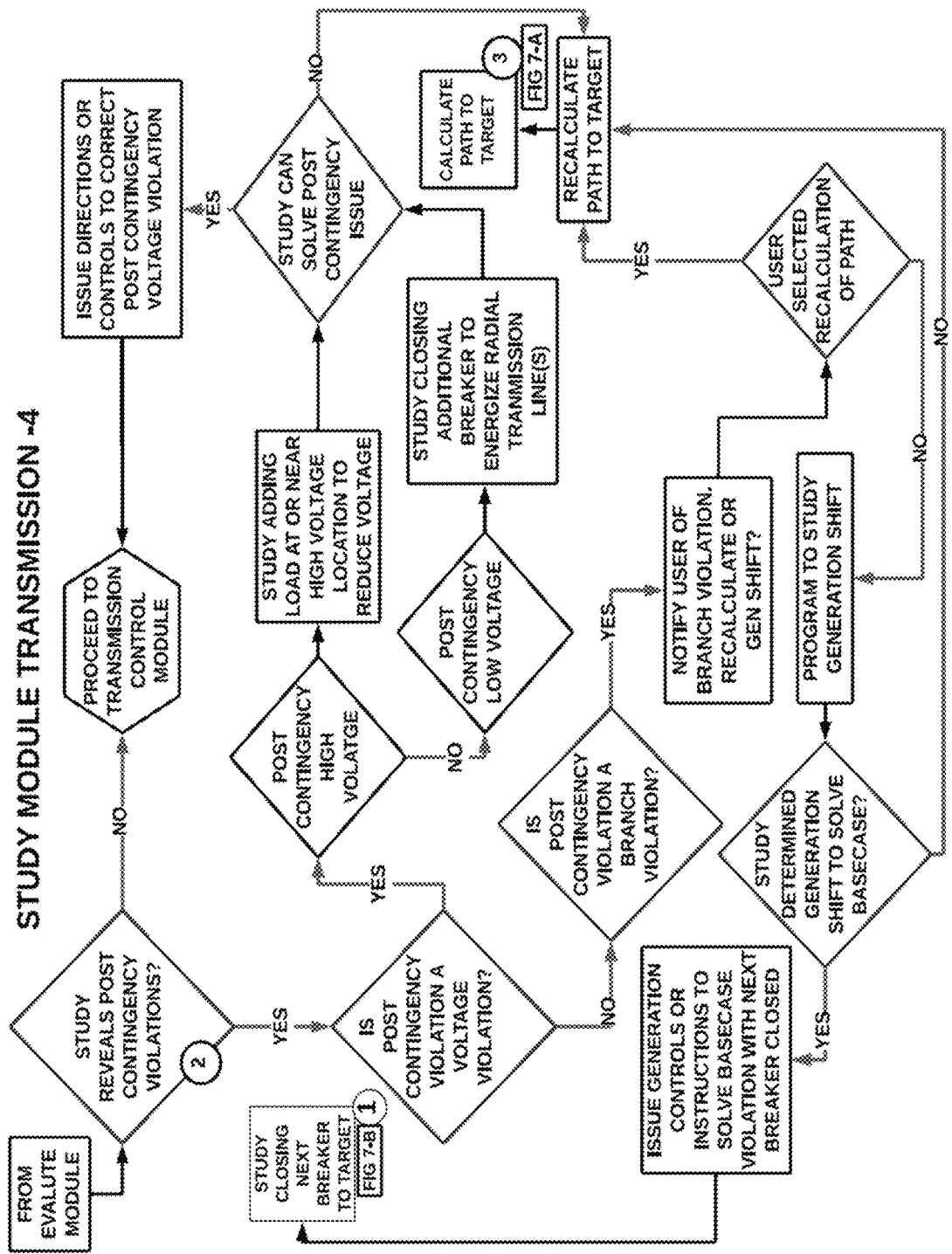
Figure 7F:
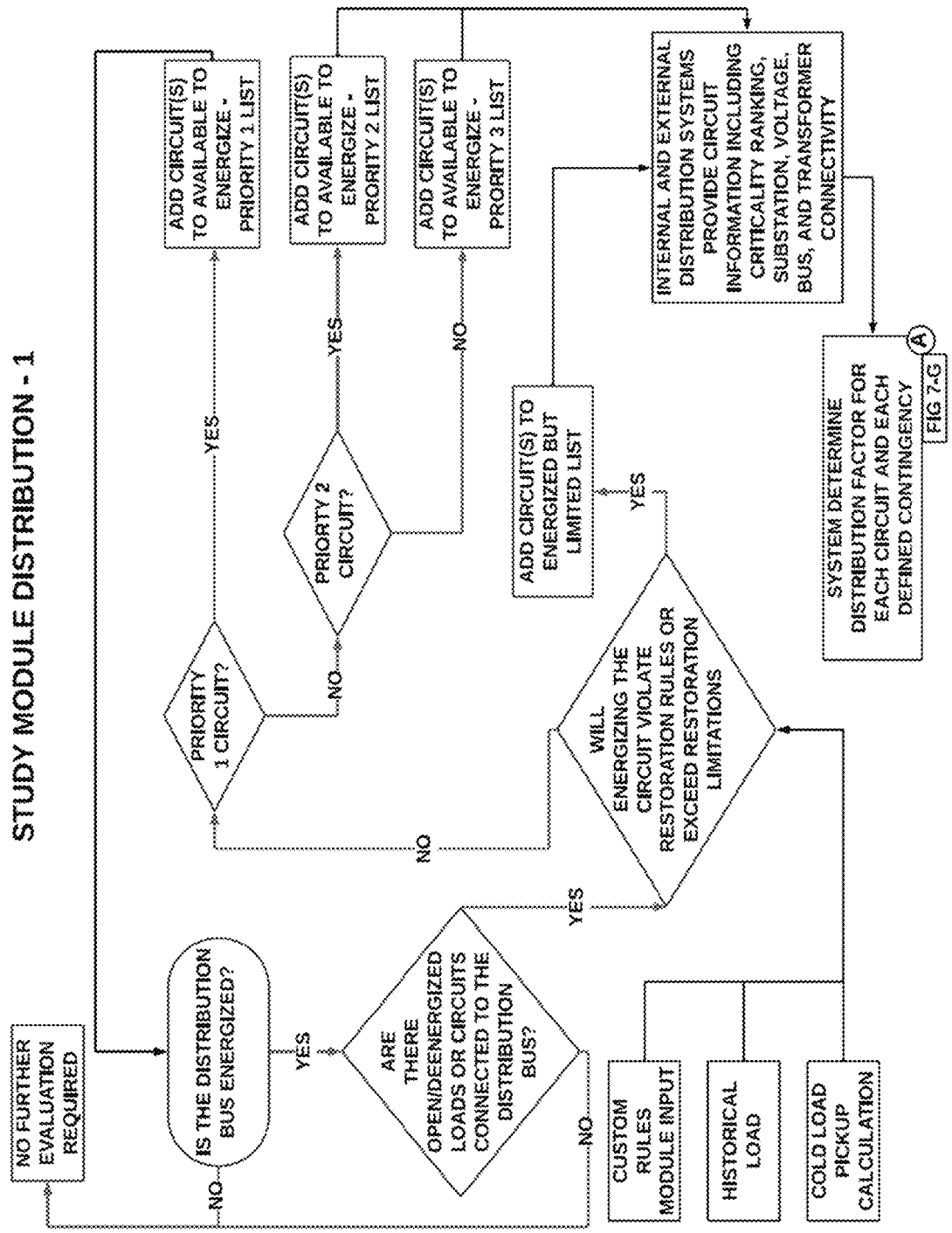
Figure 7G:
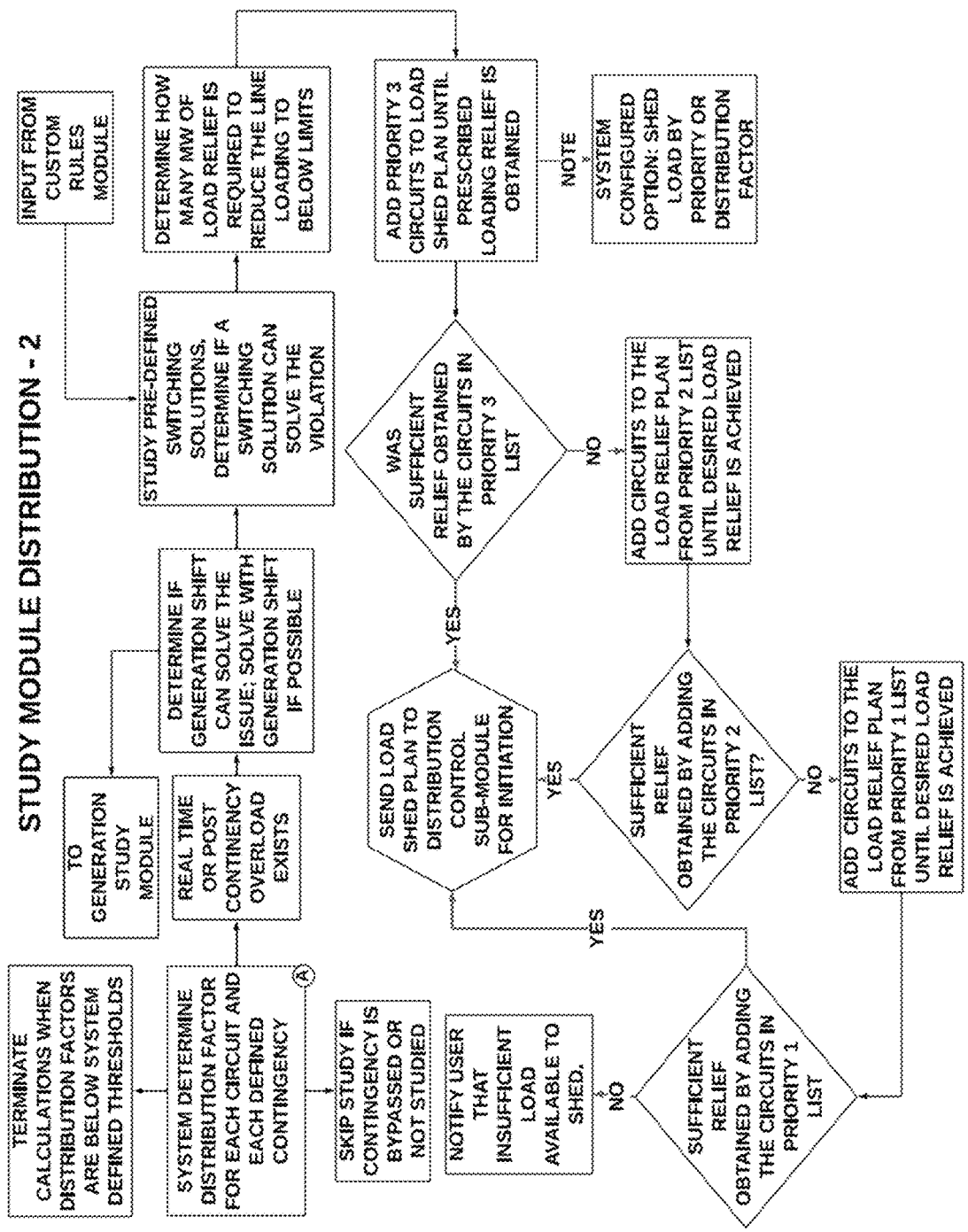

Regarding distribution, study module 535 may operate to determine which circuits of power system 600 are available for energization and add these circuits to a list maintained by study module 535 to be used by control module 540 based on circuit priority, historical load, cold load pickup values, and/or any other suitable criteria. Data and information (e.g., inputs) from custom rules module 501 may drive analysis (e.g., including decision making) in study module 535 as well. FIGS. 7A though 7G include an exemplary embodiment of a process of operation of distribution study of study module 535.

Study module 535 may also operate to determine an effect of energized distribution circuits on any overload violations that may occur (e.g., real-time or near real-time, or post-contingency). If overloads occur on power system 600 during the exemplary disclosed power restoration process, study module 535 may either directly control one or more control field components 410 (e.g., via signals and/or data) and/or make recommendations to operators (e.g., via providing output to operators such as via displays of user interfaces) to control the exemplary disclosed components to reduce loading on power system 600 (e.g., after a generation shift is studied by study module 535). Study module 535 may calculate an effect of removing each circuit of power system 600 for a particular overload to determine a load that should be removed to reduce loading on the system to within a desired range (e.g., desired limits). This calculation may incorporate circuit priority and logic from custom rules module 501 to determine circuits of power system 600 to be included in a load shed plan to reduce loading on power system 600. The exemplary disclosed features relating to load relief and solving real time and post contingency problems may be suitable for restoration efforts and also daily operations. For example, the exemplary disclosed processes may be used during daily operations as well as during restoration efforts.

Returning to FIG. 2, control module 540 may operate to either directly control one or more control field components 410 (e.g., via signals and/or data issued to control field components 410) and/or make recommendations to operators (e.g., via providing output to operators such as via displays of user interfaces) depending, for example, on what control mode may be configured. The controls issued by control module 540 may be direct, indirect, or manual. For example, direct controls may be sent directly to field devices (e.g., control field components 410). Also, for example, indirect controls may be sent through intermediary controlling systems (e.g., through transmission or distribution control systems of power system 600). These exemplary disclosed intermediary systems may issue controls to field devices (e.g., control field components 410) based on input from restoration control module 500. Further for example, manual controls may be sent to a user interface (e.g., as described herein) for users (e.g., operators) to physically control field devices (e.g., control field components 410) via any suitable mechanisms (e.g., transmission or distribution control systems of transmission subsystem 610 and distribution subsystem 615). Control module 540 may issue operating instructions for system manipulations that the user does not control (e.g., does not control directly). For example, if it is intended for system 300 to close a given control field component 410 (e.g., a distribution breaker on a bus), but that bus is outside the operational control of the user's organization (e.g., a first utility organization such as the user's company, for example an electrical distribution company or utility), manual operating instructions may be sent by restoration control module 500 to the controlling entity that may be a second utility organization (e.g., using a user interface that may be operated by the controlling entity such as a specific and/or specialized user interface display).

Figure 8A:
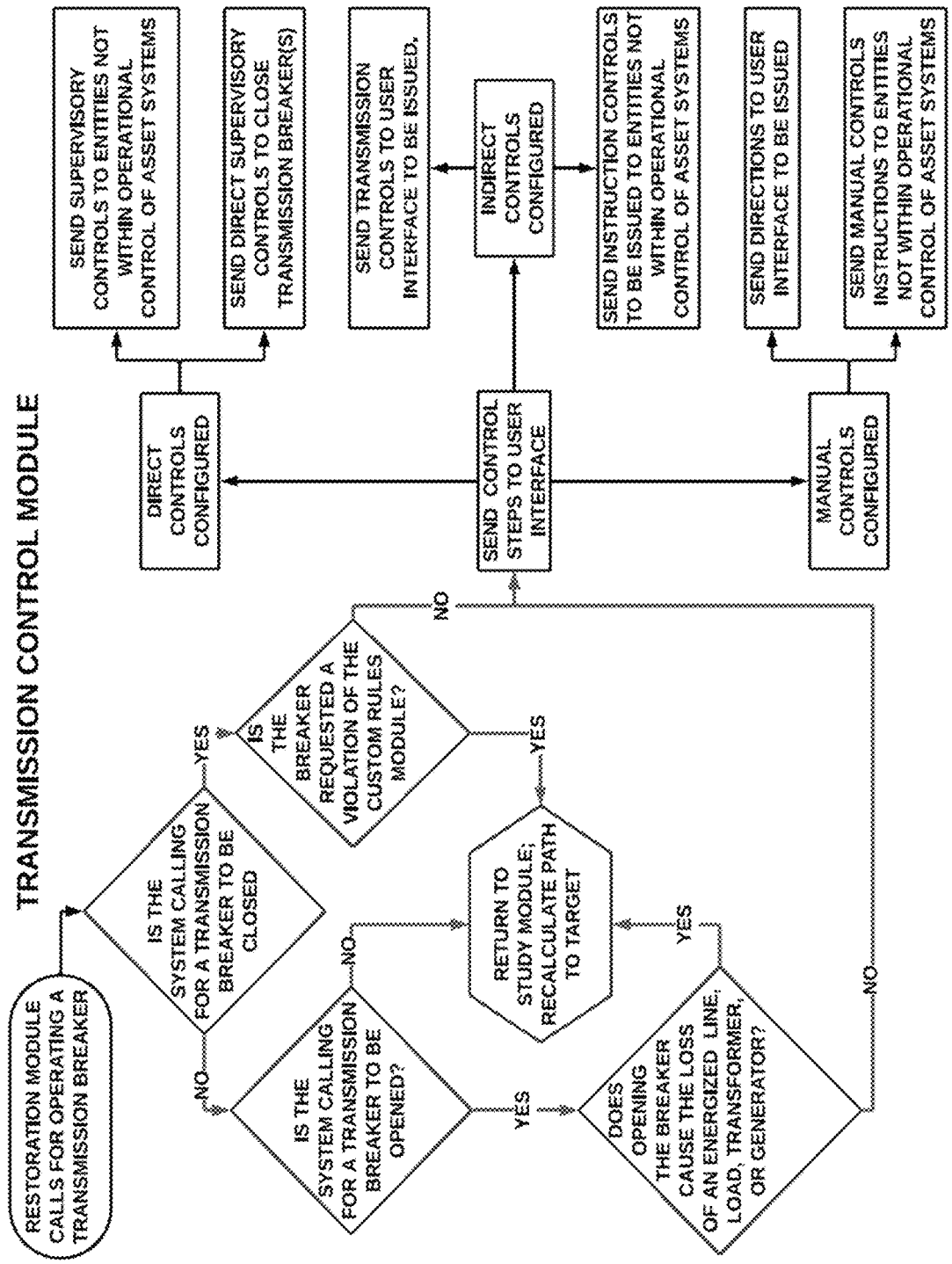
FIGS. 8A, 8B, and 8C are flowcharts showing an exemplary process of the present invention.
Figure 8B:
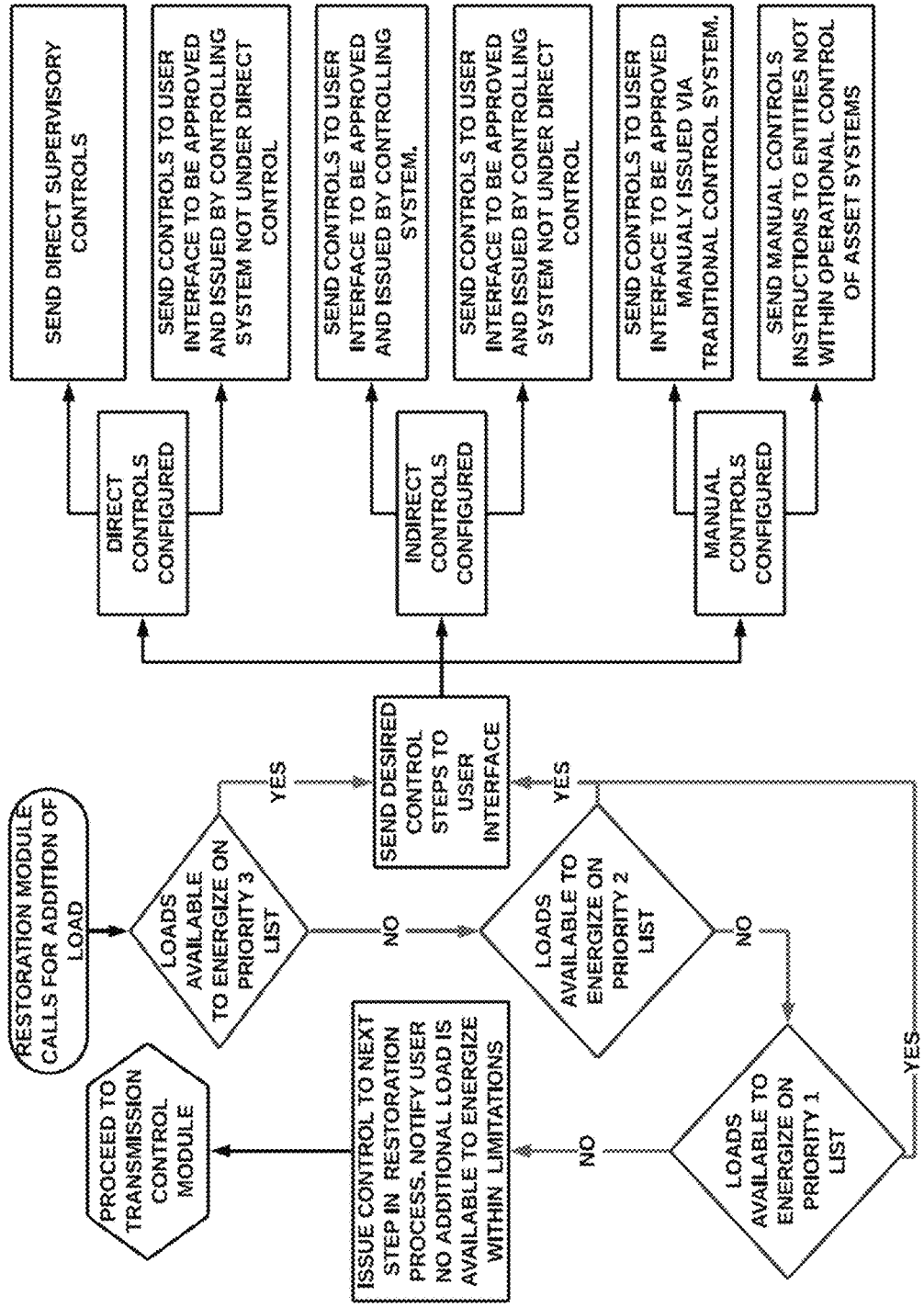
Figure 8C:
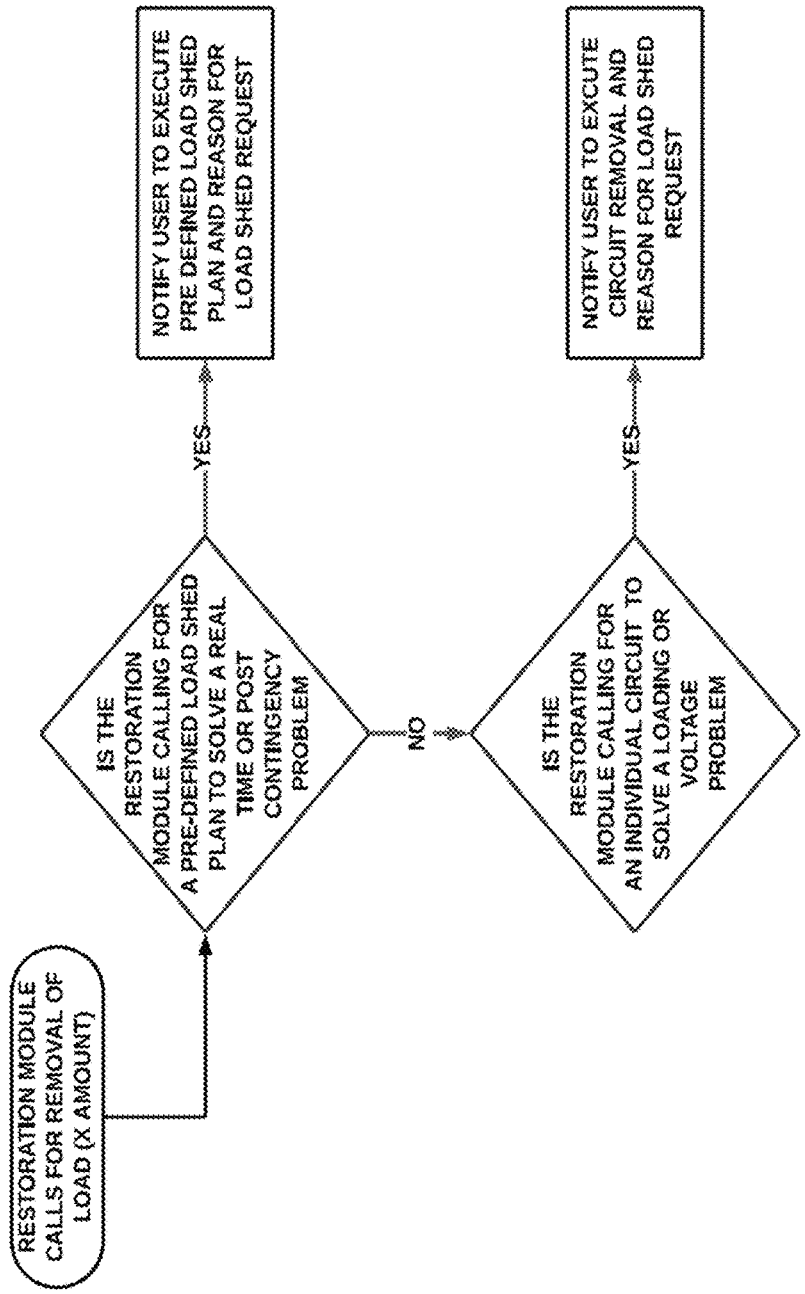
Figure 9A:
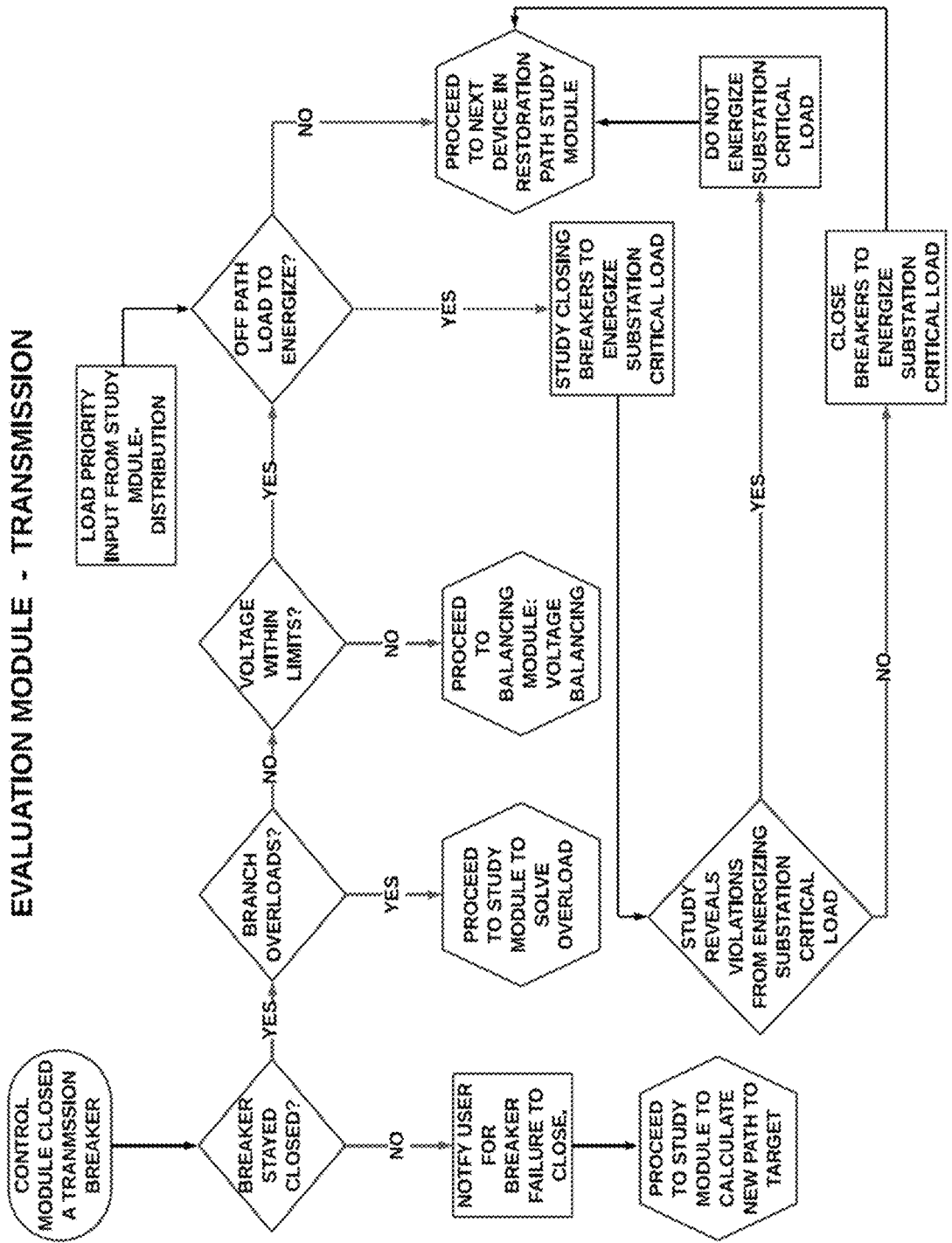
FIGS. 9A, 9B, 9C, 9D, and 9E are flowcharts showing an exemplary process of the present invention.
Figure 9B:
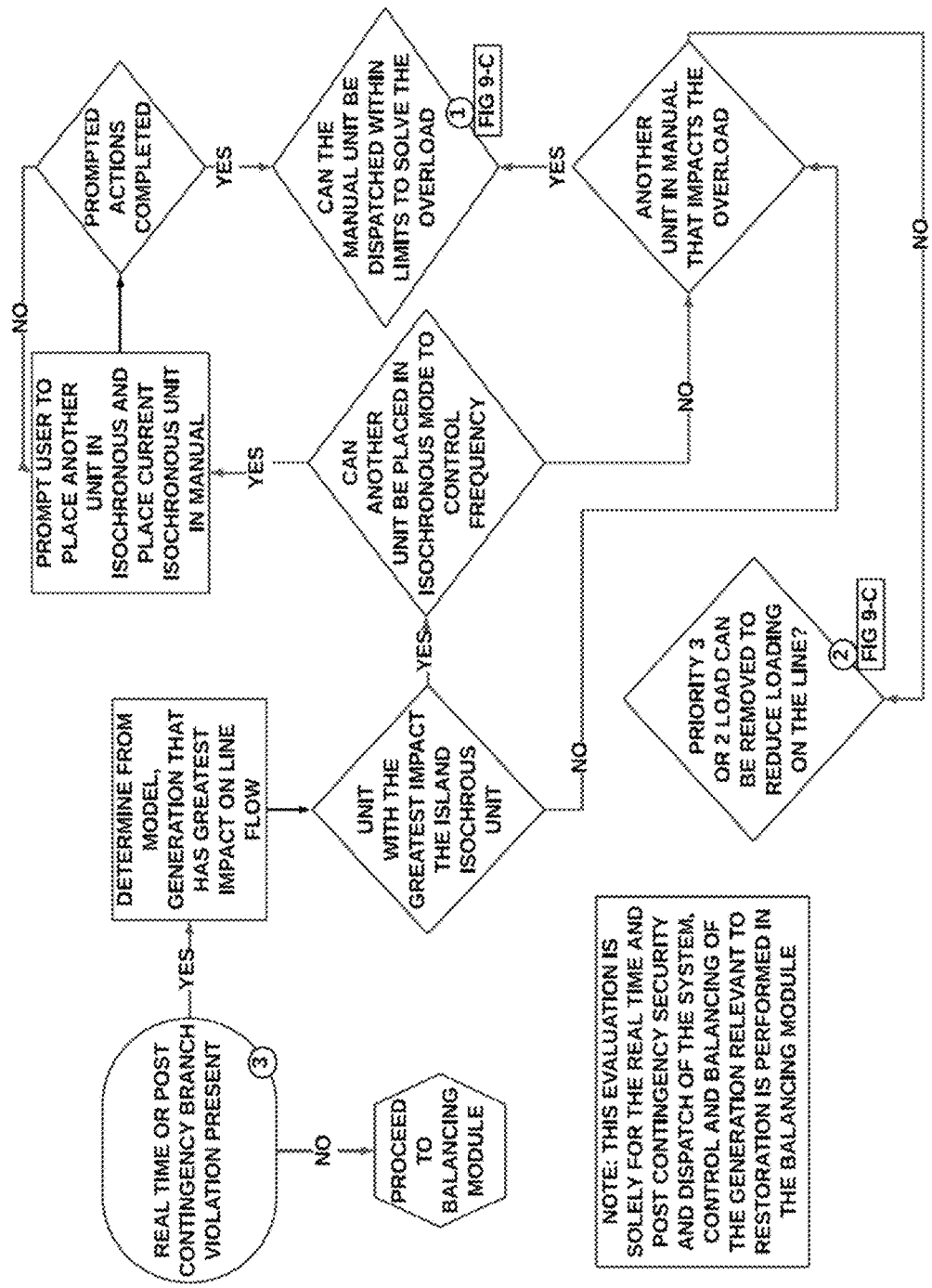
Figure 9C:
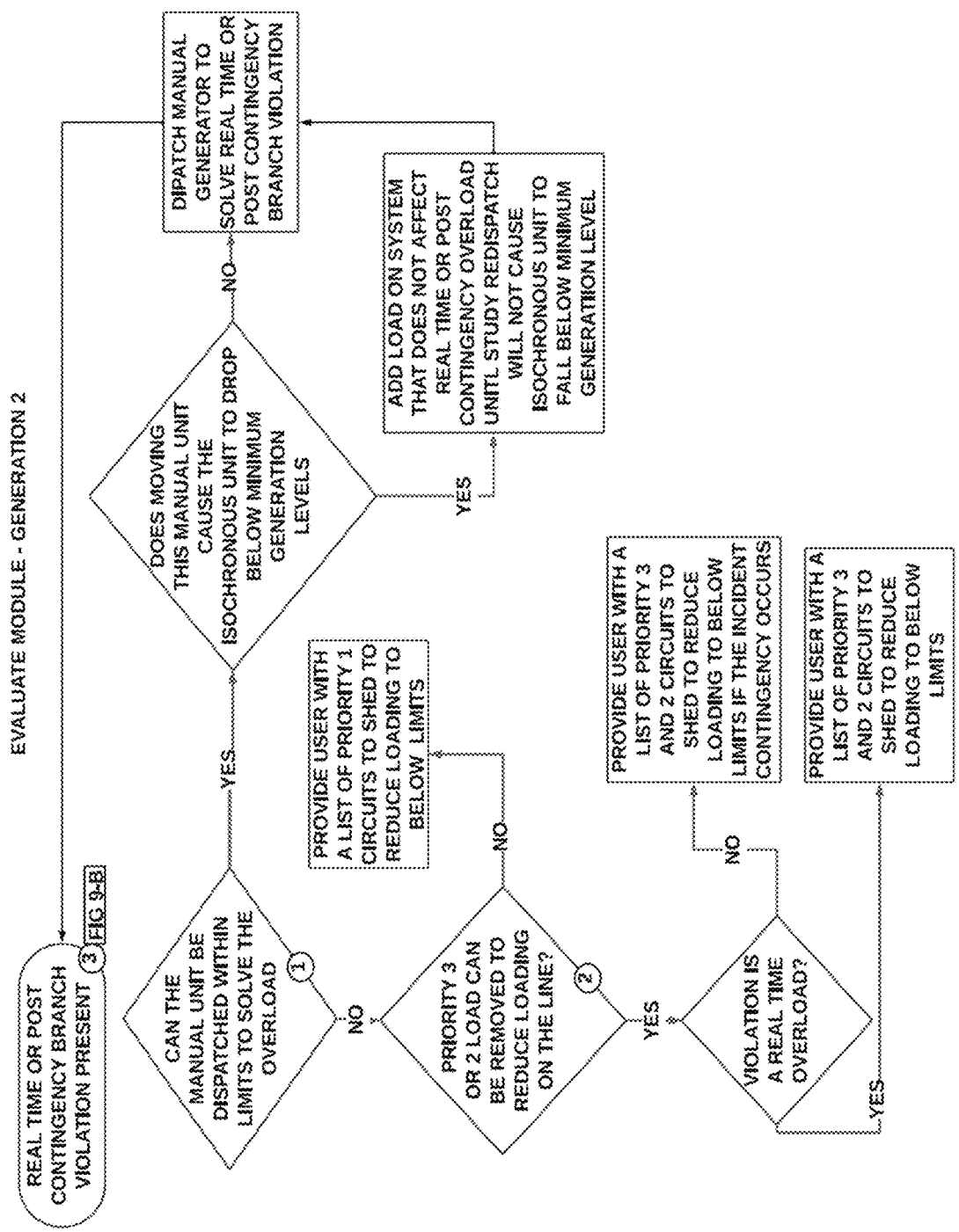
Figure 9D:
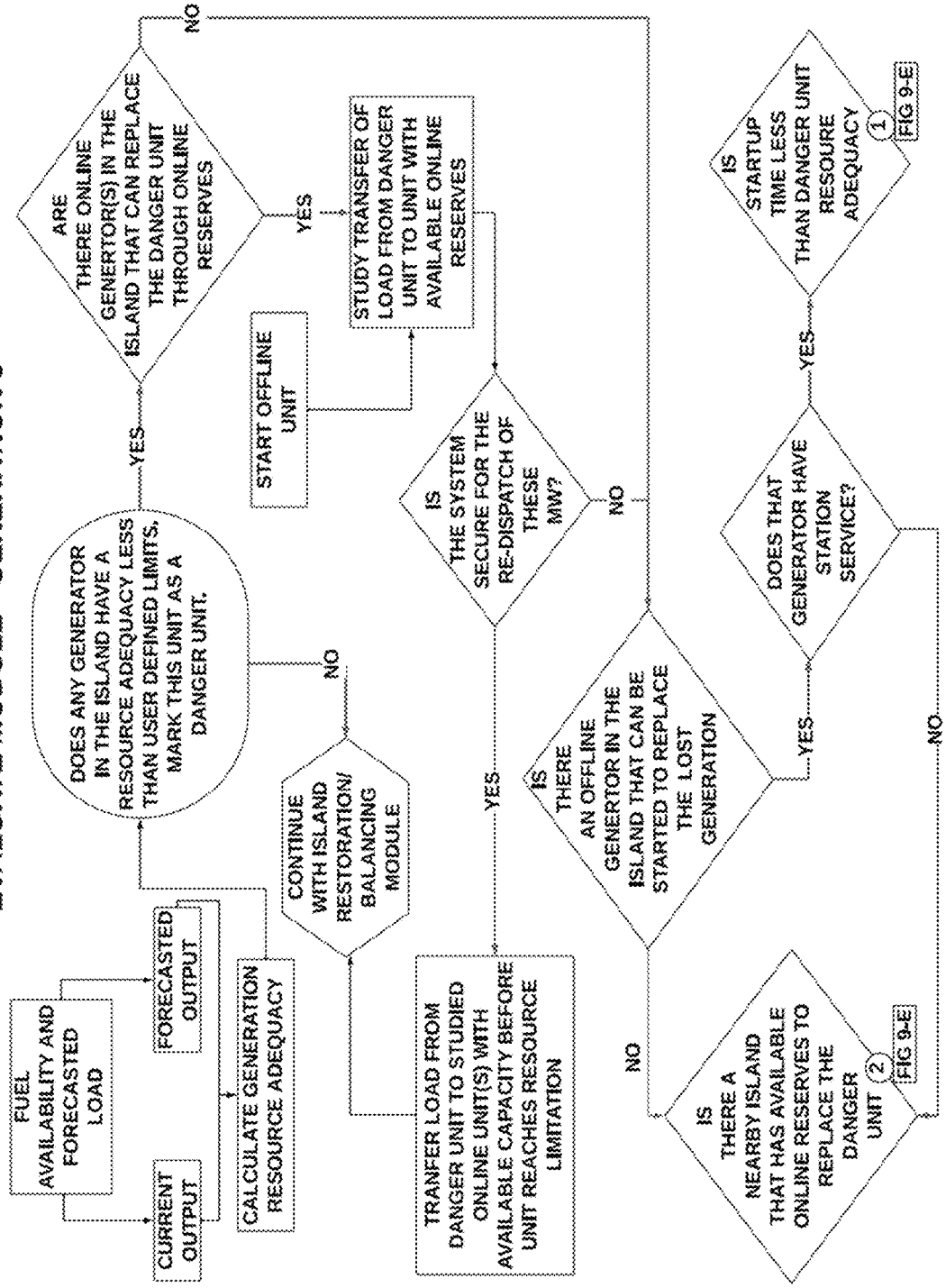
Figure 9E:
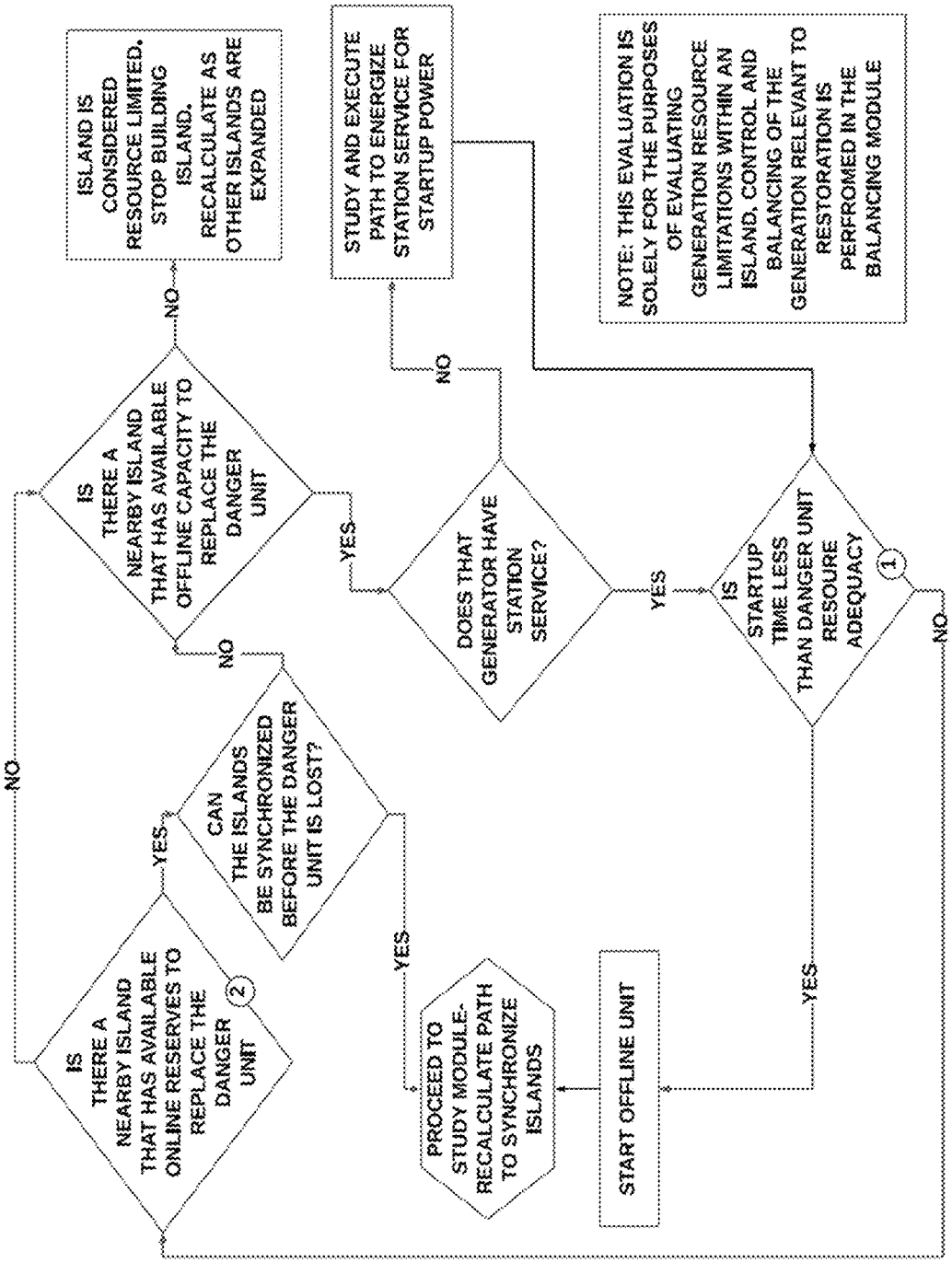

Regarding transmission, a transmission control module of control module 540 may receive information (e.g., directions) from a transmission study module of study module 535. The transmission control module of control module 540 may operate to continue to expand the system and/or establish system configuration (e.g., closing the next breaker to the target until the objective is reached) for example based on restoration control module 500 controlling control field components 410 and/or providing information (e.g., instructions) for the control of control field components 410. FIGS. 8A through 8C illustrate an exemplary embodiment of a process of operation of transmission control of control module 540.

Regarding distribution, a distribution control module of control module 540 may receive information (e.g., load shed plan data) from a distribution study module of study module 535. For example if instructed to shed load, the distribution control module of control module 540 may operate to control or provide information for the control of one or more control field components 410 (e.g., control module 540 may open or direct the opening of circuits as suitable to solve real-time or post contingency issues on system 300). Control module 540 may accomplish this by applying input from custom rules module 501 to select suitable (e.g., appropriate) circuits from data (e.g., lists) created by the distribution study module of study module 535 (e.g., circuits determined to be "Priority 1," "Priority 2," "Priority 3," "Energized but Limited," or any other desired designation). Control module 540 may also receive directions to restore circuits, for example when additional load is to be added on system 300. Control module 540 may operate generally similarly to as described above regarding shedding load. Control module 540 may also utilize input from custom rules module 501 to determine which circuits are to be restored when load restoration is suitable based on operation of restoration control module 500. FIGS. 8A through 8C include an exemplary embodiment of a process of operation of distribution control of control module 540.

Regarding generation, generation controls may be determined and issued by balancing module 530. Based on an operation of balancing module 530, substantially all parameters may be considered, and a balance of generation may thereby be coordinated within the restoration process performed by restoration control module 500.

Returning to FIG. 2, evaluation module 545 may operate to evaluate (e.g., analyze models and data to evaluate) transmission, generation, and distribution of electric power during the power restoration process. Regarding transmission evaluation, evaluation module 545 may analyze and verify that the actions completed in the transmission control module of control module 540 reflect real-time or near real-time conditions. Restoration system 400 may verify (e.g., check an analysis) that controls provided by control module 540 are successful (e.g., in having a desired effect to contribute to power restoration) and determine if any issues (e.g., unexpected system fault or limit violations) have occurred on power system 600 based on controls performed or instructed by control module 540. Evaluation module 545 may direct system 300 to return to a suitable module (e.g., an appropriate module) such as, for example, balancing module 530, study module 535, and/or control module 540, to correct issues (e.g., any unexpected system issues). Also for example, evaluation module 545 may evaluate off path critical load using the exemplary disclosed models and data of primary restoration module process 525. Evaluation module 545 may determine (e.g., check to see) if there are any critical loads on power system 600 that may be restored without energizing additional lines. Custom rules module 501 may provide inputs (e.g., definition and criteria) for deciding whether to energize a given off-path load. FIGS. 6A through 6G and 9A include an exemplary embodiment of a process of operation of transmission evaluation of evaluation module 545.

Regarding distribution evaluation, the evaluation of distribution circuits, once energized, may be performed under the transmission system restoration process (e.g., performed by the transmission study module of study module 535, the transmission control module of control module 540, and the transmission evaluation module of evaluation module 545). For example, restoration control module 500 may operate to evaluate available circuits to be energized or deenergized using the exemplary disclosed models and data described herein (e.g., and/or any other suitable evaluation criteria).

Regarding generation evaluation, any suitable primary mechanism such as generation shift may be used to address (e.g., solve) issues such as real-time (e.g., real-time or near real-time) or post contingency thermal overloads. For example, restoration control module 500 may operate to provide a generation shift for raising and/or lowering an output of generators of generation subsystem 605 on power system 600 to shift how power is flowing. Although during normal system operations, market conditions may be considered in this process, system security may take priority over market conditions during system restoration and/or emergency conditions and operations. Evaluation module 545 may operate to solve such real-time (e.g., real-time or near real-time) and post contingency overloads using generation shifts as a primary method to mitigate adverse conditions. Evaluation module 545 may also operate to analyze (e.g., consider) the implications of moving generation in a restoration state using the exemplary disclosed data and models (e.g., when there are relatively few generators of generation subsystem 605 connected to the grid and/or one generating unit may be controlling frequency for an energized island). FIGS. 9B, 9C, 9D, and 9E illustrate an exemplary embodiment of a process of operation of generation evaluation of evaluation module 545.

Evaluation module 545 may also operate to perform an evaluation to determine if any unit on the system is fuel or resource limited (e.g., identify danger units). Evaluation module 545 may receive inputs (e.g., forecasts, fuel availability, and projects availability at current and/or maximum output into the future) from other modules of system 300 and/or any other suitable source. Evaluation module 545 may also operate to reconfigure power system 600 to account for resource limited generation (e.g., of danger units) so that these criteria (e.g., these limitations) do not negatively impact the exemplary disclosed power restoration process. Evaluation module 545 may determine (e.g., identify or flag) units that may be in danger of exhausting or losing their fuel resource at current or forecasted loads (e.g., one or more units may be flagged as "danger units"). As an illustrative example, in the case of an oil-burning unit, such a danger unit may exhaust oil supplies. As another illustrative example, in the case of a solar unit, such a danger unit may be determined based on forecasting weather fronts and/or reaching sunset (e.g., time periods when the sun is not available as an energy source). Restoration system 400 (e.g., evaluation module 545) may determine actions (e.g., calculate a plan) to maintain or replace some or any resource limited generator within a given island based on shifting generation within the island or by synchronizing with neighboring islands with capacity to replace the danger unit's power generation MW.

As many iterations of primary restoration module process 525 suitable for power restoration (e.g., to prepare for synchronization as described below or to complete power restoration) may be performed. For example, as many iterations of operation described above of balancing module 530, study module 535, control module 540, and evaluation module 545 as suitable for power restoration may be performed (e.g., to prepare for synchronization as described below or to complete power restoration).

Figure 10:
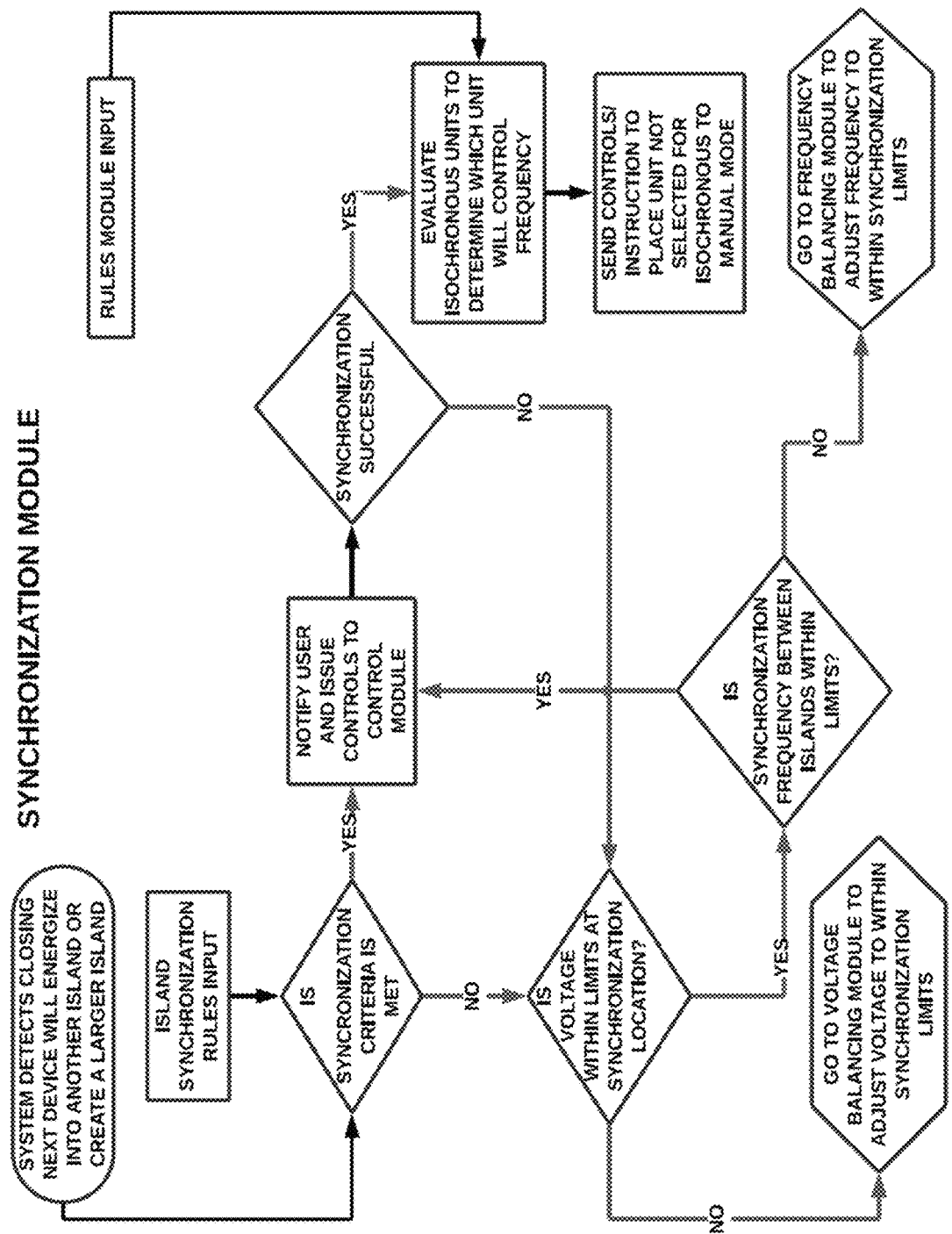
FIG. 10 is a flowchart showing an exemplary process of the present invention.
Figure 11A:
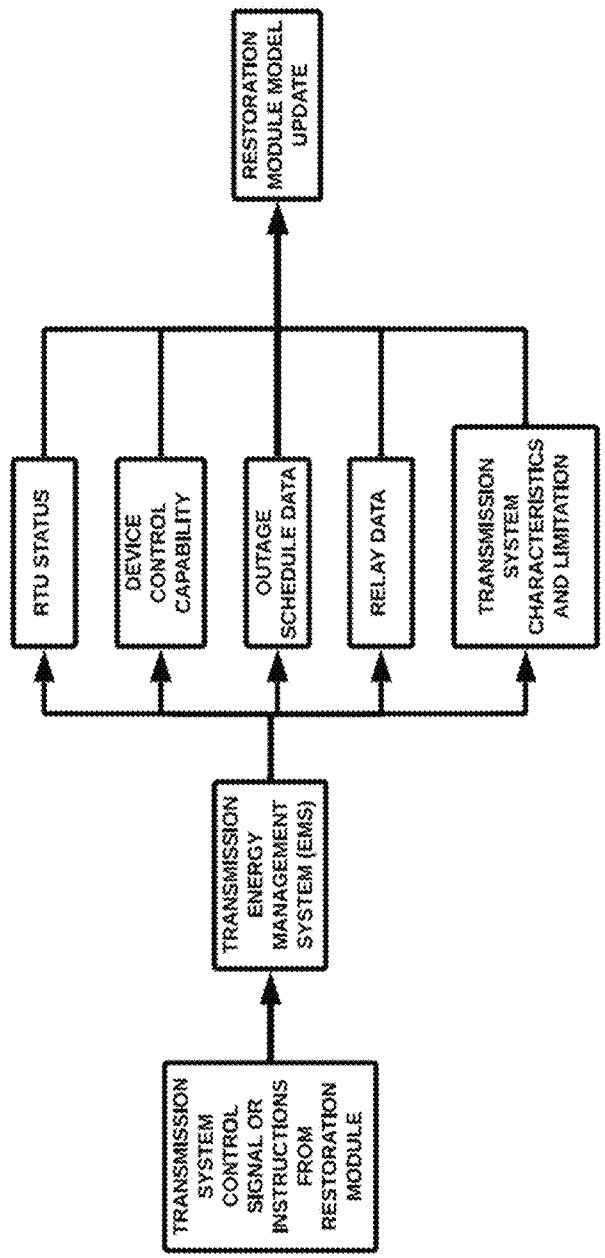
FIGS. 11A, 11B, and 11C are flowcharts showing an exemplary process of the present invention.
Figure 11B:
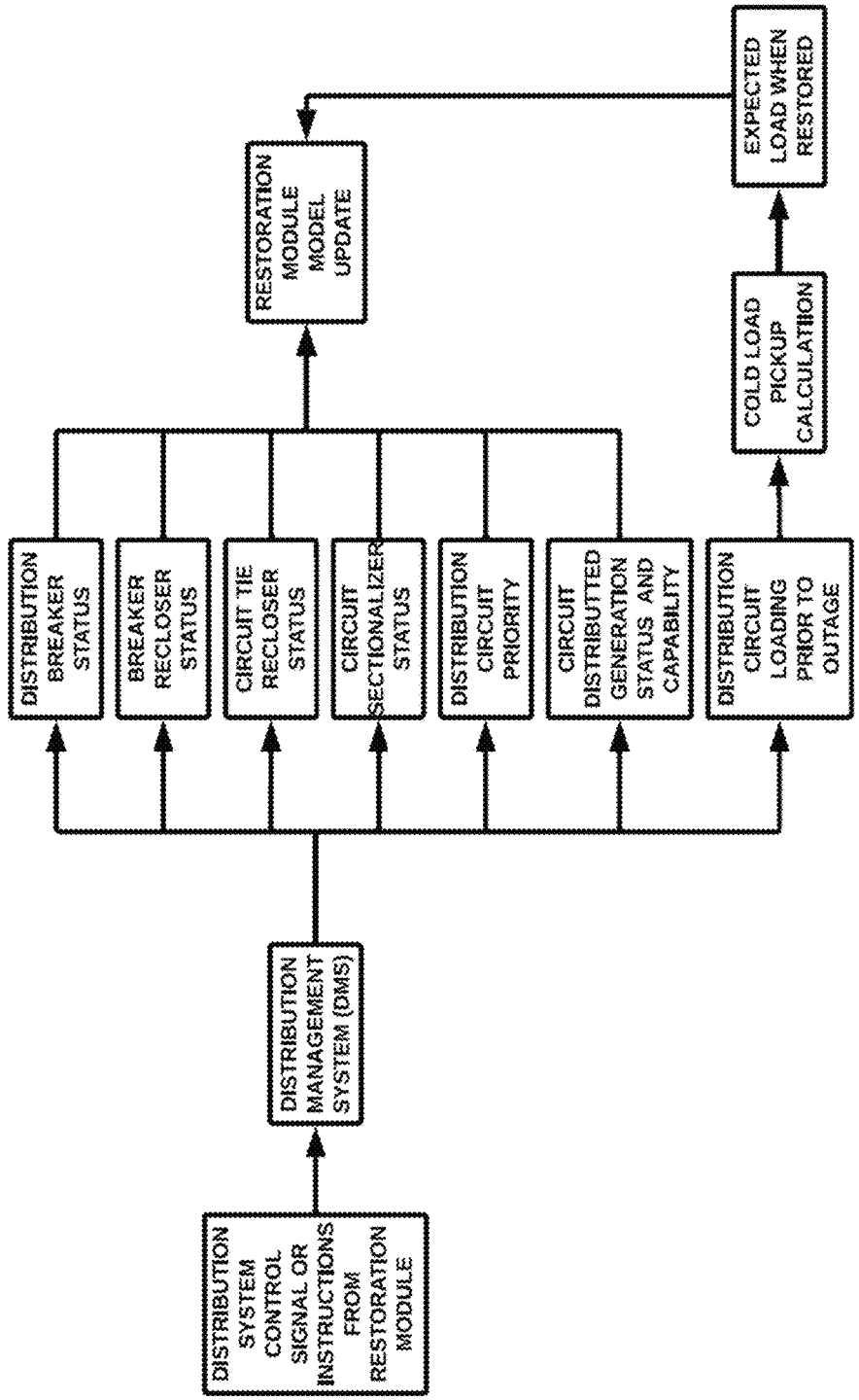
Figure 11C:
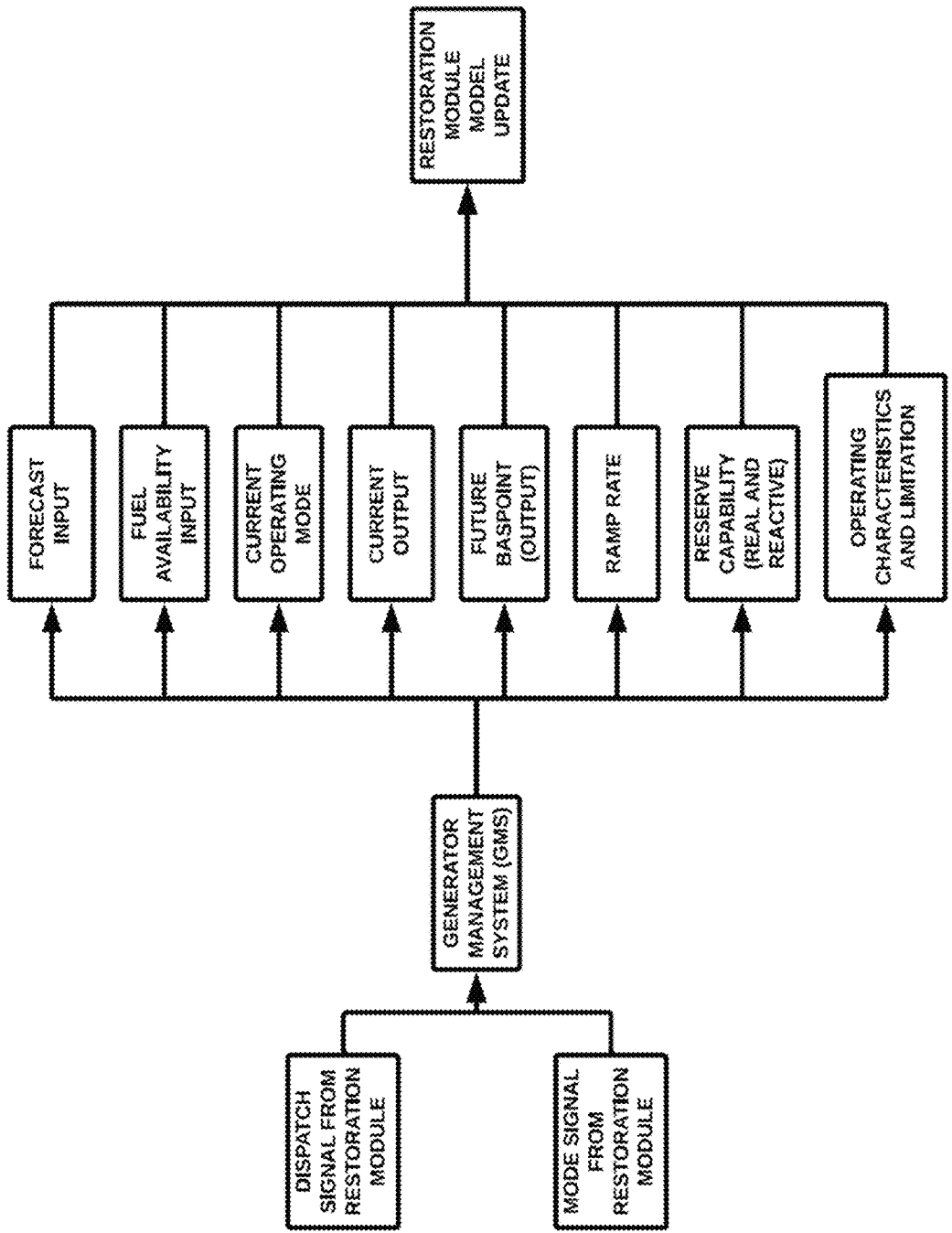

Returning to FIG. 2, a synchronization module 550 may operate to perform a synchronization operation following any suitable number of iterations of primary restoration module process 525. Synchronization module 550 may operate to integrate or combine islands (e.g., bring islands together) to form larger, stronger islands. Synchronization module 550 may receive input from custom rules module 501 to determine whether synchronization may be suitable (e.g., permitted) based for example on customized criteria and/or good utility practice. If there are rules violations based on the input from custom rules module 501, restoration control module 500 may notify users and may attempt to make adjustments to power system 600 that can allow for synchronization of islands. Output may be sent to control module 540 when conditions are within specified limits and a larger island (e.g., or one or more larger islands) is formed. Once formed, the larger island may be reconfigured by system 300 to have one unit (e.g., a single unit) in isochronous mode. FIG. 10 is a flowchart illustrating an exemplary embodiment of a process of operation of synchronization module 550. FIGS. 11A through 11C illustrate exemplary transmission, distribution, and generation data exchange for use in an operation of restoration control module 500.

Primary restoration module process 525 may then be repeated for example as described above (e.g., restoration system 400 may continue with the same logic loop to continue to grow the energized system). As many combined iterations, including both primary restoration module process 525 and synchronization module 550, as suitable for power restoration may be performed.

Figure 12:
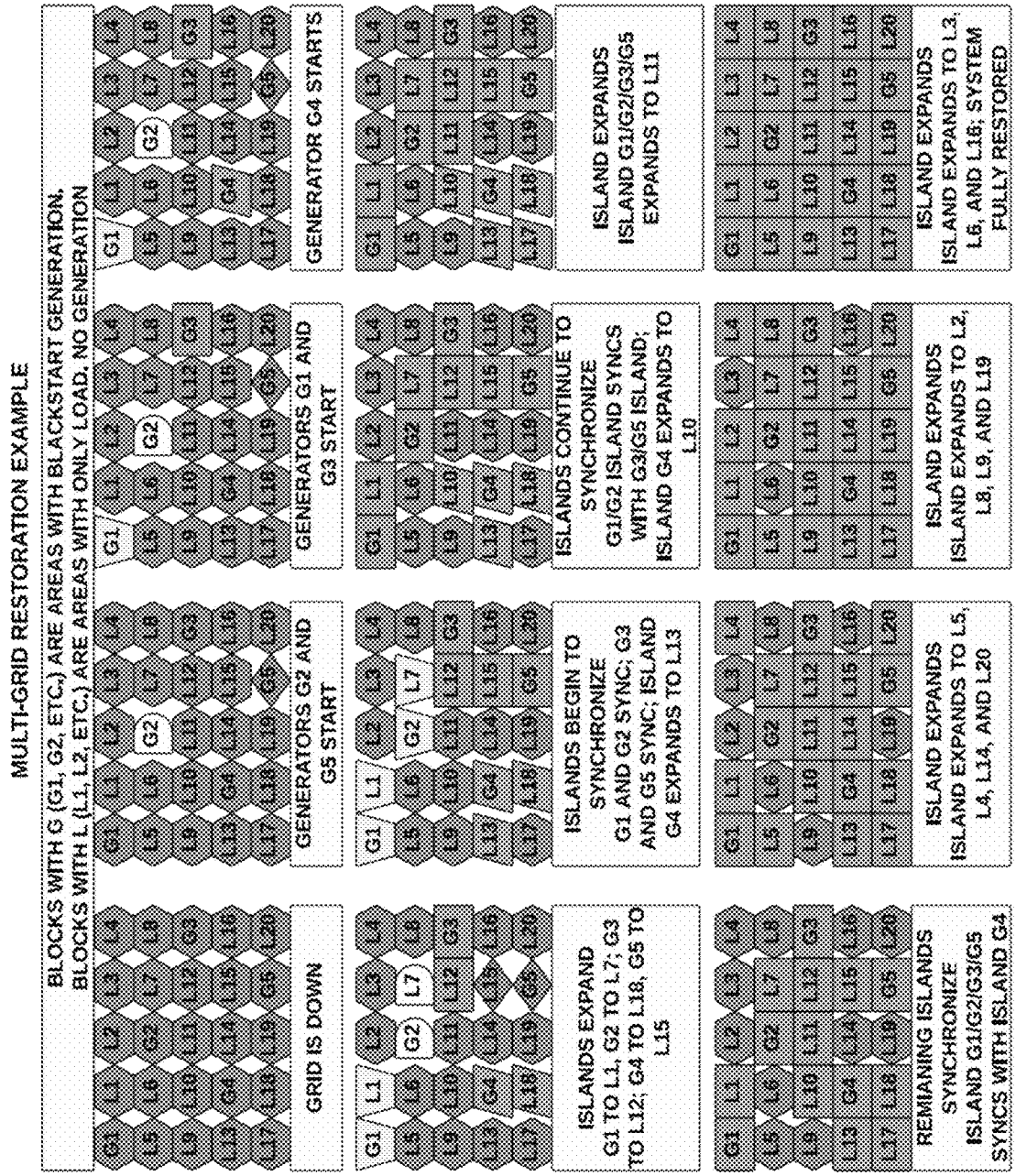
FIG. 12 is a schematic illustration of an exemplary process of the present invention for restoring power.

System 300 including restoration system 400 may perform multi-grid restoration. System 300 may be configured to build multiple islands (e.g., energized islands as described above) simultaneously and synchronize the islands for example as described above. FIG. 12 depicts multiple generators starting on an exemplary system and expanding while picking up load while synchronizing with each other. The result may be a fully restored system (e.g., generation may be located in blocks designated with "G" and load may be located in blocks designated with "L").

An exemplary process for performing power restoration will now be described, which may include steps similar to the exemplary process described above regarding FIG. 2. System 300 (e.g., including restoration system 400 and restoration control module 500) may operate to determine if a system separation or system shutdown has occurred for example as described above regarding island detection module 510. System 300 may then operate to balance remaining islands (e.g., energized islands), if they exist, and display a status of the islands to operators for example as described above regarding initial island balancing module 515. System 300 may then operate to prepare power system 600 for restoration, including determining initial conditions to prepare for a system restoration (e.g., including for example opening some or all deenergized breakers on the system and/or opening some or all reactive control devices). System 300 may then start a black start resource (e.g., an exemplary disclosed black start unit, for example a fossil fuel or solar powered unit, which may have a capability to start without assistance from the power grid). System 300 may then operate to determine a next location to energize (e.g., an adjacent substation near the black start generator, which may be part of a path to a priority target that may be for example 5 or 10 substations away). As an illustrative example, a priority target may be safe shutdown power to a nuclear unit or startup power to a larger generator. System 300 may then operate to have power system 600 pick up load as the energized system is built. For example as voltage on the system may rise due to the Ferranti effect (e.g., lightly loaded transmission lines causing a voltage increase), system 300 may operate to effectively lower this voltage by adding load to the system (e.g., including determining where critical loads are and whether an island has sufficient generation capacity to handle the load addition). System 300 may then operate to balance power generation and load for example as described above regarding balancing module 530 (e.g., for example to avoid relatively large frequency deviations that may cause generators on the system to trip offline, at which point the restoration process would be restarted and the restoration progress would be lost). System 300 may also operate to adjust voltage and provide reactive adjustments to maintain generating units operating within suitable criteria (e.g., within prescribed limits), including controlling one generating unit in an island controlling frequency and other online units in the island receiving MW from the unit controlling frequency as it approaches a capacity threshold (e.g., limit).

System 300 may then operate to grow the one or more energized islands to become larger. For example, as targets are reached as described above, increasing generation and load may be added to power system 600. The energized system may become stronger and may be capable of expanding further, at which time relatively lower priority loads and areas may be added to expand the one or more energized island. System 300 may then operate to synchronize islands to strengthen the system. As different islands are built by system 300, the islands can be synchronized together by operation of system 300 to become a larger island, which may create a stronger system and allow for further expansion. System 300 may then operate to synchronize power system 600 back to the interconnection (e.g., a regional or national level power grid). For example, when multiple islands in the interconnection are built, they can be synchronized back together based on an operation of system 300, thereby restoring (e.g., recreating) part of an interconnection or a substantially entire interconnection, at which time normal operations may resume.

In at least some exemplary embodiments, the exemplary disclosed system may integrate suitable data, perform complex logic operations, and control or direct the restoration of a power grid utilizing the exemplary disclosed automated processes. The exemplary disclosed system may thereby provide relatively quicker and more efficient restoration of a power grid. The exemplary disclosed method may provide processes (e.g., logic processes) that may reduce and/or substantially eliminate errors and allow restoration of a power grid to proceed relatively securely, quickly, and reliably, thereby providing restoration before supporting infrastructure of the power grid fails.

In at least some exemplary embodiments, the exemplary disclosed system and method may gather and integrate models and information from power systems into a single source of data (e.g., accurate information) that may allow for a comprehensive restoration process. This restoration process may utilize repeatable and consistent steps that provide for reliability and safety of a power grid as it is built to substantially full restoration. The exemplary disclosed system and method may provide suitable sharing of information with and/or between regional reliability operators, neighboring utilities, and power generation operators. The exemplary disclosed system and method may operate to determine targets and objectives for restoring selected portions of the system in a logical, methodical, and system-specific manner.

In at least some exemplary embodiments, the exemplary disclosed system and method may simultaneously implement multiple islands, targets, and objectives. The exemplary disclosed system and method may also identify operating information and provide (e.g., display) that operating information to system operators for use in restoration of a power grid.

In at least some exemplary embodiments, the exemplary disclosed system and method may provide system assessment and balancing, including relatively quickly determining (e.g., diagnosing) an extent and severity of large-scale system events. The exemplary disclosed system and method may operate in real-time or near real-time using data of system conditions (e.g., real-time or near real-time data). The exemplary disclosed system and method may operate to calculate and provide restoration time estimates (e.g., to operators and/or to users or customers of power grids). The exemplary disclosed system and method may operate to send control signals to system components and/or to provide direction information to operators and/or users. For example, the exemplary disclosed system and method may operate to directly control power grid components and/or to give advance notice of steps for personnel to perform on power grid components, which may be dispatched in advance of a time at which an action is to be performed, thereby reducing time spent by field operators moving to component (e.g., equipment) switching locations. The exemplary disclosed system and method may perform recalculation of a power restoration route until faulted equipment is repaired and restored based on input received from relay systems indicating potentially inoperable (e.g., faulted) components (e.g., and/or based on input from other systems indicating equipment that may be out of service for maintenance activities).

The invention includes other illustrative embodiments ("Embodiments") as follows.

Embodiment 1: A method for controlling power restoration of a power grid, comprising: setting initial conditions on the power grid based on a combined model of the power grid, setting the initial conditions including at least one of controlling a plurality of field components of the power grid or sending information for controlling the plurality of field components, wherein controlling the plurality of field components includes opening a plurality of breakers; performing a first iterative process including: performing a balancing operation that includes determining if a frequency of a black start generator of the power grid meets generator criteria, determining if a voltage of a generator voltage bus of the power grid meets bus criteria, or determining if an MW of an isochronous generator of the power grid meets MW criteria; performing a study operation that includes identifying at least a first breaker and a second breaker of the plurality of breakers on a path to a target of the power grid, analyzing the effect of closing the first breaker on the power grid, and analyzing the effect of closing the second breaker on the power grid with the first breaker closed; performing a control operation that includes controlling at least one transmission breaker that is the first breaker or the second breaker to close or sending information for controlling the at least one transmission breaker to close, or controlling at least one distribution breaker that is the first breaker or the second breaker to close or sending information for controlling the at least one distribution breaker to close to add load to the power grid; and performing an evaluation operation that includes determining if closing the at least one transmission breaker or the at least one distribution breaker causes the power grid to operate outside of the generator criteria, the bus criteria, or the MW criteria; and performing a second iterative process including: using the first iterative process to expand a plurality of energized islands of the power grid; and performing a synchronization operation that combines the plurality of expanded energized islands when synchronization criteria based on the generator criteria, the bus criteria, or the MW criteria are met.

Embodiment 2: The method of Embodiment 1, wherein the first iterative process proceeds with performing the balancing operation first, followed by performing the study operation second, followed by performing the control operation third, followed by performing the evaluation operation fourth.

Embodiment 3: The method of Embodiment 1, further comprising detecting and then identifying any portions of the plurality of energized islands, which are energized prior to setting the initial conditions, to an operator of the power grid.

Embodiment 4: The method of Embodiment 3, further comprising controlling or sending information for controlling a generator of the portions of the plurality of energized islands to operate in an isochronous mode.

Embodiment 5: The method of Embodiment 1, wherein performing the balancing operation further includes energizing an off path radial line of the power grid.

Embodiment 6: The method of Embodiment 1, wherein the study operation further includes identifying a plurality of circuits for energization and determining a priority order of the plurality of circuits for energization.

Embodiment 7: The method of Embodiment 1, wherein sending information for controlling the at least one transmission breaker or the at least one distribution breaker to close while performing the control operation includes sending information from a first utility organization that does not control the at least one transmission breaker or the at least one distribution breaker to a second utility organization that controls the at least one transmission breaker or the at least one distribution breaker.

Embodiment 8: The method of Embodiment 1, wherein performing the evaluation operation further includes outputting a list of circuits to shed or close by opening at least some of the plurality of breakers.

Embodiment 9: The method of Embodiment 1, wherein the combined model of the power grid is based on data exchange between at least one utility organization operating the power grid and at least one other utility organization controlling at least one of generation units, transmission units, or distribution units of the power grid.

Embodiment 10: The method of Embodiment 1, wherein the plurality of field components further includes at least one of a transformer tap, a relay, a switch, or a reactor, a capacitor, or a FACTS device.

Embodiment 11: A system for controlling power restoration of a power grid, comprising: a controller configured to control a plurality of field components of the power grid; at least one module comprising computer-executable code stored in non-volatile memory; and a memory for storing instructions, wherein the controller executes the instructions; wherein the controller causes the system to: set initial conditions on the power grid based on a combined model of the power grid, setting the initial conditions including at least one of controlling the plurality of field components of the power grid or sending information for controlling the plurality of field components, wherein controlling the plurality of field components includes opening a plurality of breakers; perform a first iterative process including: performing a balancing operation that includes determining if a frequency of a black start generator of the power grid meets generator criteria, determining if a voltage of a generator voltage bus of the power grid meets bus criteria, or determining if an MW of an isochronous generator of the power grid meets MW criteria; performing a study operation that includes identifying at least a first breaker and a second breaker of the plurality of breakers on a path to a target of the power grid, analyzing the effect of closing the first breaker on the power grid, and analyzing the effect of closing the second breaker on the power grid with the first breaker closed; performing a control operation that includes controlling at least one transmission breaker that is the first breaker or the second breaker to close or sending information for controlling the at least one transmission breaker to close, or controlling at least one distribution breaker that is the first breaker or the second breaker to close or sending information for controlling the at least one distribution breaker to close to add load to the power grid; and performing an evaluation operation that includes determining if closing the at least one transmission breaker or the at least one distribution breaker causes the power grid to operate outside of the generator criteria, the bus criteria, or the MW criteria; and perform a second iterative process including: using the first iterative process to expand a plurality of energized islands of the power grid; and performing a synchronization operation that combines the plurality of expanded energized islands when synchronization criteria based on the generator criteria, the bus criteria, or the MW criteria are met.

Embodiment 12: The system of Embodiment 11, wherein the first iterative process proceeds with performing the balancing operation first, followed by performing the study operation second, followed by performing the control operation third, followed by performing the evaluation operation fourth.

Embodiment 13: The system of Embodiment 11, wherein the controller further causes the system to: detect and then identify any portions of the plurality of energized islands, which are energized prior to setting the initial conditions, to an operator of the power grid; and control or send information for controlling a generator of the portions of the plurality of energized islands to operate in an isochronous mode.

Embodiment 14: The system of Embodiment 11, wherein sending information for controlling the at least one transmission breaker or the at least one distribution breaker to close while performing the control operation includes sending information from a first utility organization that does not control the at least one transmission breaker or the at least one distribution breaker to a second utility organization that controls the at least one transmission breaker or the at least one distribution breaker.

Embodiment 15: The system of Embodiment 11, wherein performing the evaluation operation further includes outputting a list of circuits to shed or close by opening at least some of the plurality of breakers.

Embodiment 16: The system of Embodiment 11, wherein the combined model of the power grid is based on data exchange between at least one utility organization operating the power grid and at least one other utility organization controlling at least one of generation units, transmission units, or distribution units of the power grid.

Embodiment 17: A method for controlling power restoration of a power grid, comprising: setting initial conditions on the power grid based on a combined model of the power grid, setting the initial conditions including at least one of controlling a plurality of field components of the power grid or sending information for controlling the plurality of field components, wherein controlling the plurality of field components includes opening a plurality of breakers; performing a first iterative process including: first, performing a balancing operation that includes determining if a frequency of a black start generator of the power grid meets generator criteria, determining if a voltage of a generator voltage bus of the power grid meets bus criteria, and determining if an MW of an isochronous generator of the power grid meets MW criteria; second, performing a study operation that includes identifying at least a first breaker and a second breaker of the plurality of breakers on a path to a target of the power grid, analyzing the effect of closing the first breaker on the power grid, and analyzing the effect of closing the second breaker on the power grid with the first breaker closed; third, performing a control operation that includes controlling at least one transmission breaker that is the first breaker or the second breaker to close or sending information for controlling the at least one transmission breaker to close, and controlling at least one distribution breaker that is the first breaker or the second breaker to close or sending information for controlling the at least one distribution breaker to close to add load to the power grid; and fourth, performing an evaluation operation that includes determining if closing the at least one transmission breaker or the at least one distribution breaker causes the power grid to operate outside of the generator criteria, the bus criteria, and the MW criteria; performing a second iterative process including: using the first iterative process to expand a plurality of energized islands of the power grid; and performing a synchronization operation that combines the plurality of expanded energized islands when synchronization criteria based on the generator criteria, the bus criteria, and the MW criteria are met; and detecting and then identifying any portions of the plurality of energized islands, which are energized prior to setting the initial conditions, to an operator of the power grid.

Embodiment 18: The method of Embodiment 17, wherein sending information for controlling the at least one transmission breaker or the at least one distribution breaker to close while performing the control operation includes sending information from a first utility organization that does not control the at least one transmission breaker or the at least one distribution breaker to a second utility organization that controls the at least one transmission breaker or the at least one distribution breaker.

Embodiment 19: The method of Embodiment 17, wherein the combined model of the power grid is based on data exchange between at least one utility organization operating the power grid and at least one other utility organization controlling at least one of generation units, transmission units, or distribution units of the power grid.

Embodiment 20: The method of Embodiment 17, wherein the plurality of field components further includes at least one of each of a transformer tap, a relay, a switch, and a capacitor component.

The exemplary disclosed system and method may provide an efficient and effective technique for quick and efficient restoration of a power grid. The exemplary disclosed system and method may provide an efficient and effective technique for reducing or eliminating mistakes made in restoration of power systems. For example, the exemplary disclosed system and method may provide an efficient technique for sharing and coordinating information for use in restoring power systems.

It is contemplated that in at least some exemplary embodiments, the exemplary disclosed system and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Figure 13:
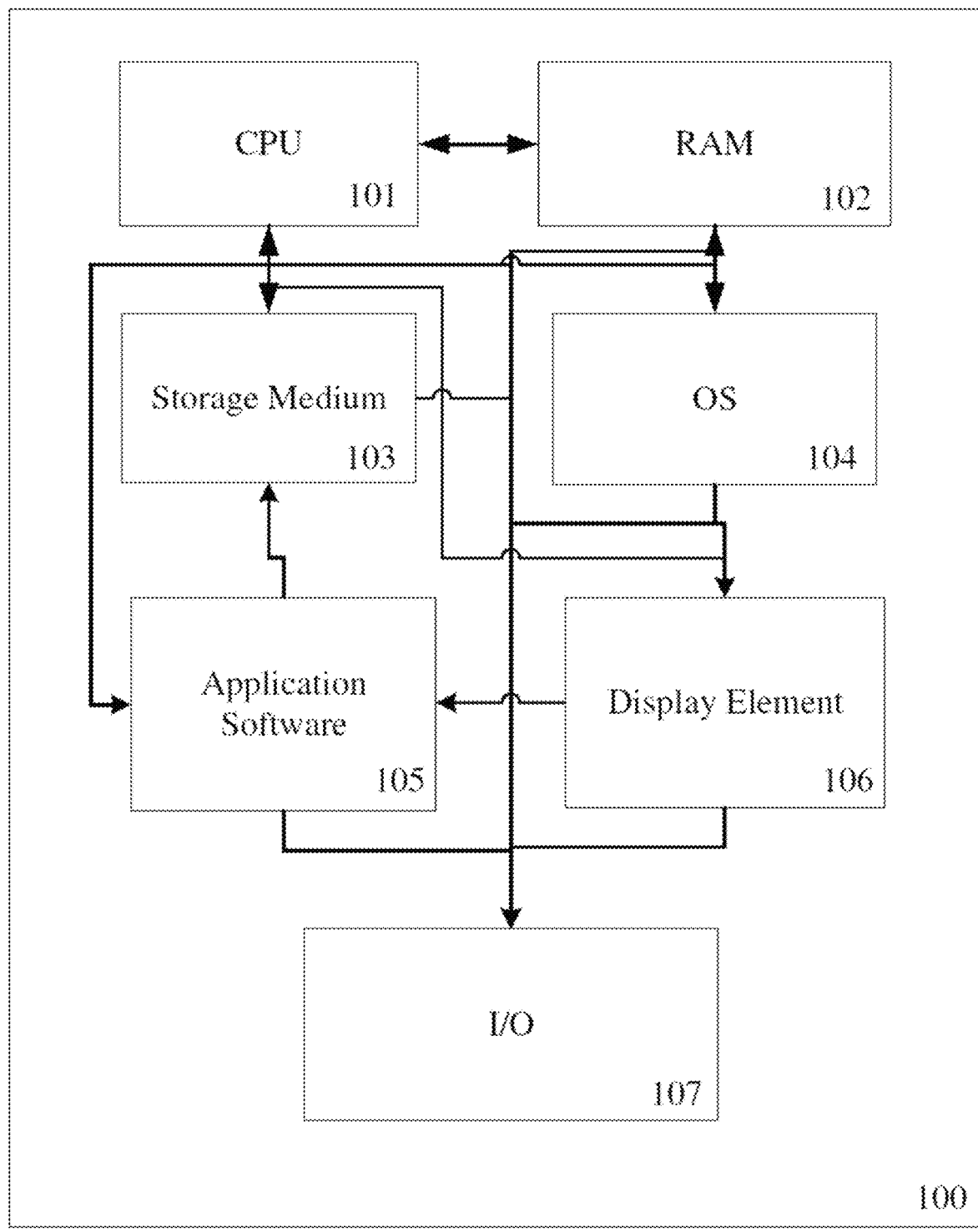
FIG. 13 is a schematic illustration of an exemplary computing device, in accordance with at least some exemplary embodiments of the present disclosure.

An illustrative representation of a computing device appropriate for use with embodiments of the system of the present disclosure is shown in FIG. 13. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 14, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 14:
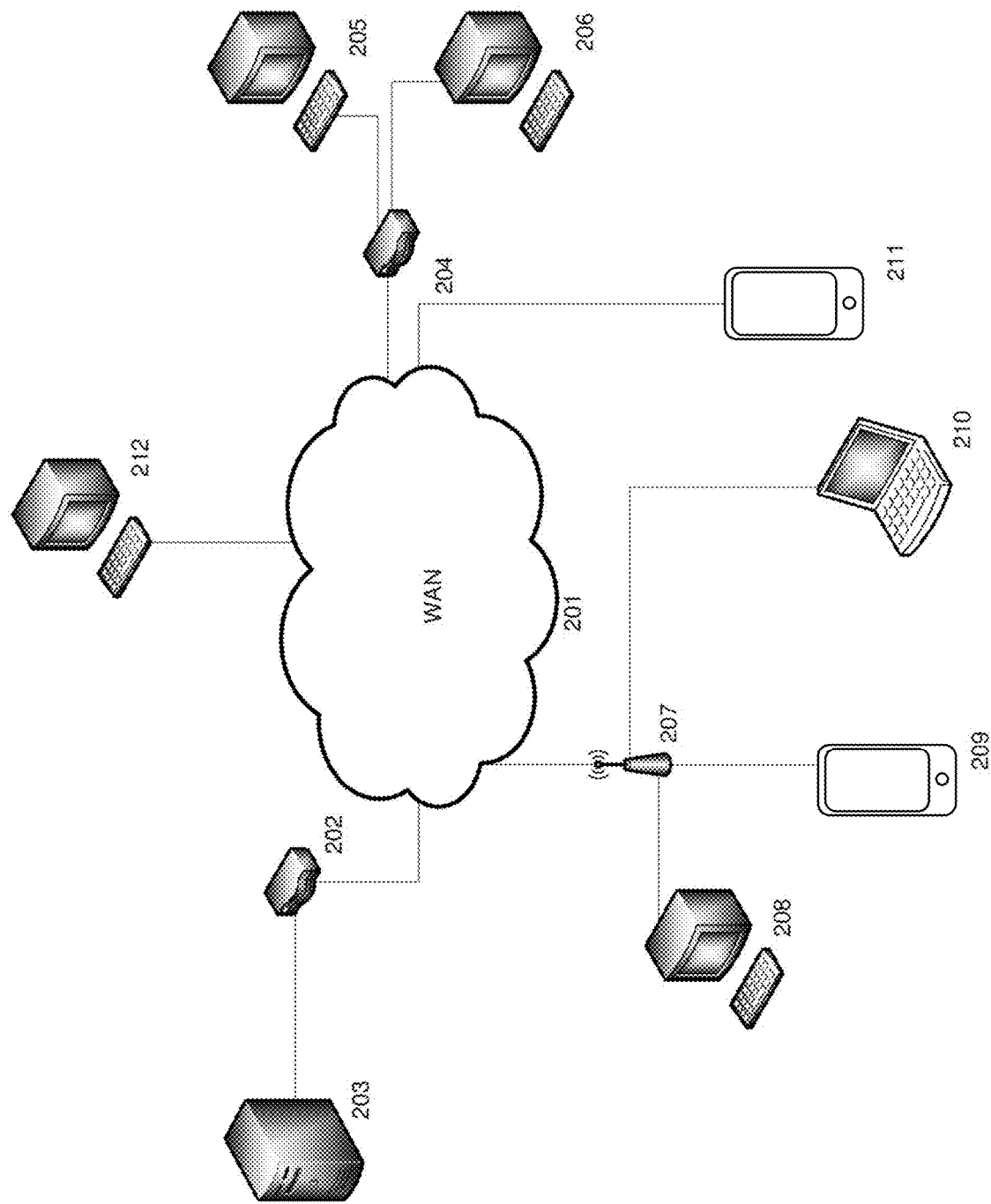
FIG. 14 is a schematic illustration of an exemplary network, in accordance with at least some exemplary embodiments of the present disclosure.

Referring to FIG. 14, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 14, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, satellite communications, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A method for controlling power restoration of a power grid, comprising:
    setting initial conditions on the power grid based on a combined model of the power grid, setting the initial conditions including at least one of controlling a plurality of field components of the power grid or sending information for controlling the plurality of field components, wherein controlling the plurality of field components includes opening a plurality of breakers;
    performing a first iterative process including:
        performing a balancing operation that includes determining if a frequency of a black start generator of the power grid meets generator criteria, determining if a voltage of a generator voltage bus of the power grid meets bus criteria, or determining if an MW of an isochronous generator of the power grid meets MW criteria;
        performing a study operation that includes identifying at least a first breaker and a second breaker of the plurality of breakers on a path to a target of the power grid, analyzing the effect of closing the first breaker on the power grid, and analyzing the effect of closing the second breaker on the power grid with the first breaker closed;

performing a control operation that includes controlling at least one transmission breaker that is the first breaker or the second breaker to close or sending information for controlling the at least one transmission breaker to close, or controlling at least one distribution breaker that is the first breaker or the second breaker to close or sending information for controlling the at least one distribution breaker to close to add load to the power grid; and performing an evaluation operation that includes determining if closing the at least one transmission breaker or the at least one distribution breaker causes the power grid to operate outside of the generator criteria, the bus criteria, or the MW criteria; and performing a second iterative process including:

using the first iterative process to expand a plurality of energized islands of the power grid; and performing a synchronization operation that combines the plurality of expanded energized islands when synchronization criteria based on the generator criteria, the bus criteria, or the MW criteria are met;

detecting and then identifying any portions of the plurality of energized islands, which are energized prior to setting the initial conditions, to an operator of the power grid; and controlling or sending information for controlling a generator of the portions of the plurality of energized islands to operate in an isochronous mode.

2. The method of claim 1, wherein the first iterative process proceeds with performing the balancing operation first, followed by performing the study operation second, followed by performing the control operation third, followed by performing the evaluation operation fourth.

3. The method of claim 1, wherein performing the balancing operation further includes energizing an off path radial line of the power grid.

4. The method of claim 1, wherein the study operation further includes identifying a plurality of circuits for energization and determining a priority order of the plurality of circuits for energization.

5. The method of claim 1, wherein sending information for controlling the at least one transmission breaker or the at least one distribution breaker to close while performing the control operation includes sending information from a first utility organization that does not control the at least one transmission breaker or the at least one distribution breaker to a second utility organization that controls the at least one transmission breaker or the at least one distribution breaker.

6. The method of claim 1, wherein performing the evaluation operation further includes outputting a list of circuits to shed or close by opening at least some of the plurality of breakers.

7. The method of claim 1, wherein the combined model of the power grid is based on data exchange between at least one utility organization operating the power grid and at least one other utility organization controlling at least one of generation units, transmission units, or distribution units of the power grid.

8. The method of claim 1, wherein the plurality of field components further includes at least one of a transformer tap, a relay, a switch, or a reactor, a capacitor, or a FACTS device.

9. A system for controlling power restoration of a power grid, comprising:

a controller configured to control a plurality of field components of the power grid;

at least one module comprising computer-executable code stored in non-volatile memory; and a memory for storing instructions, wherein the controller executes the instructions;

wherein the controller causes the system to:

set initial conditions on the power grid based on a combined model of the power grid, setting the initial conditions including at least one of controlling the plurality of field components of the power grid or sending information for controlling the plurality of field components, wherein controlling the plurality of field components includes opening a plurality of breakers;

perform a first iterative process including:

performing a balancing operation that includes determining if a frequency of a black start generator of the power grid meets generator criteria, determining if a voltage of a generator voltage bus of the power grid meets bus criteria, or determining if an MW of an isochronous generator of the power grid meets MW criteria;

performing a study operation that includes identifying at least a first breaker and a second breaker of the plurality of breakers on a path to a target of the power grid, analyzing the effect of closing the first breaker on the power grid, and analyzing the effect of closing the second breaker on the power grid with the first breaker closed;

performing a control operation that includes controlling at least one transmission breaker that is the first breaker or the second breaker to close or sending information for controlling the at least one transmission breaker to close, or controlling at least one distribution breaker that is the first breaker or the second breaker to close or sending information for controlling the at least one distribution breaker to close to add load to the power grid; and performing an evaluation operation that includes determining if closing the at least one transmission breaker or the at least one distribution breaker causes the power grid to operate outside of the generator criteria, the bus criteria, or the MW criteria; and perform a second iterative process including:

using the first iterative process to expand a plurality of energized islands of the power grid; and performing a synchronization operation that combines the plurality of expanded energized islands when synchronization criteria based on the generator criteria, the bus criteria, or the MW criteria are met;

detect and then identify any portions of the plurality of energized islands, which are energized prior to setting the initial conditions, to an operator of the power grid; and control or send information for controlling a generator of the portions of the plurality of energized islands to operate in an isochronous mode.

10. The system of claim 9, wherein the first iterative process proceeds with performing the balancing operation first, followed by performing the study operation second, followed by performing the control operation third, followed by performing the evaluation operation fourth.

11. The system of claim 9, wherein sending information for controlling the at least one transmission breaker or the at least one distribution breaker to close while performing the control operation includes sending information from a first utility organization that does not control the at least one transmission breaker or the at least one distribution breaker to a second utility organization that controls the at least one transmission breaker or the at least one distribution breaker.

12. The system of claim 9, wherein performing the evaluation operation further includes outputting a list of circuits to shed or close by opening at least some of the plurality of breakers.

13. The system of claim 9, wherein the combined model of the power grid is based on data exchange between at least one utility organization operating the power grid and at least one other utility organization controlling at least one of generation units, transmission units, or distribution units of the power grid.

14. A method for controlling power restoration of a power grid, comprising:
   setting initial conditions on the power grid based on a combined model of the power grid, setting the initial conditions including at least one of controlling a plurality of field components of the power grid or sending information for controlling the plurality of field components, wherein controlling the plurality of field components includes opening a plurality of breakers;
   performing a first iterative process including:
      first, performing a balancing operation that includes determining if a frequency of a black start generator of the power grid meets generator criteria, determining if a voltage of a generator voltage bus of the power grid meets bus criteria, and determining if an MW of an isochronous generator of the power grid meets MW criteria;
      second, performing a study operation that includes identifying at least a first breaker and a second breaker of the plurality of breakers on a path to a target of the power grid, analyzing the effect of closing the first breaker on the power grid, and analyzing the effect of closing the second breaker on the power grid with the first breaker closed;
      third, performing a control operation that includes controlling at least one transmission breaker that is the first breaker or the second breaker to close or sending information for controlling the at least one transmission breaker to close, and controlling at least one distribution breaker that is the first breaker or the second breaker to close or sending information for controlling the at least one distribution breaker to close to add load to the power grid; and
      fourth, performing an evaluation operation that includes determining if closing the at least one transmission breaker or the at least one distribution breaker causes the power grid to operate outside of the generator criteria, the bus criteria, and the MW criteria;
   performing a second iterative process including:
      using the first iterative process to expand a plurality of energized islands of the power grid; and
      performing a synchronization operation that combines the plurality of expanded energized islands when synchronization criteria based on the generator criteria, the bus criteria, and the MW criteria are met; and
   detecting and then identifying any portions of the plurality of energized islands, which are energized prior to setting the initial conditions, to an operator of the power grid; and
   controlling or sending information for controlling a generator of the portions of the plurality of energized islands to operate in an isochronous mode.

15. The method of claim 14, wherein sending information for controlling the at least one transmission breaker or the at least one distribution breaker to close while performing the control operation includes sending information from a first utility organization that does not control the at least one transmission breaker or the at least one distribution breaker to a second utility organization that controls the at least one transmission breaker or the at least one distribution breaker.

16. The method of claim 14, wherein the combined model of the power grid is based on data exchange between at least one utility organization operating the power grid and at least one other utility organization controlling at least one of generation units, transmission units, or distribution units of the power grid.

17. The method of claim 14, wherein the plurality of field components further includes at least one of each of a transformer tap, a relay, a switch, and a capacitor component.

* * * * *